(12) United States Patent
Tanaka et al.

(10) Patent No.: US 9,796,425 B2
(45) Date of Patent: Oct. 24, 2017

(54) VEHICLE SIDE STRUCTURE

(71) Applicant: Toyota Jidosha Kabushiki Kaisha, Toyota-shi (JP)

(72) Inventors: Shinobu Tanaka, Toyota (JP); Takuya Oshima, Okazaki (JP); Kenjiro Yamada, Yoyota (JP); Tatsunori Mori, Toyota (JP); Yasuhiko Fukuzumi, Nagoya (JP); Shuuitsu Yamamoto, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/951,688

(22) Filed: Nov. 25, 2015

(65) Prior Publication Data
US 2016/0152119 A1   Jun. 2, 2016

(30) Foreign Application Priority Data

Nov. 27, 2014 (JP) .................. 2014-240530

(51) Int. Cl.
*B60J 5/04* (2006.01)
*B62D 25/04* (2006.01)

(52) U.S. Cl.
CPC ............ *B62D 25/04* (2013.01); *B60J 5/0426* (2013.01); *B60J 5/0429* (2013.01)

(58) Field of Classification Search
CPC ........ B60J 5/042; B60J 5/0422; B60J 5/0423; B60J 5/0425; B60J 5/0426; B60J 5/0429; B60J 5/0438; B60J 5/0443; B62D 25/04
See application file for complete search history.

(56) References Cited

U.S. PATENT DOCUMENTS

| | | | |
|---|---|---|---|
| 4,013,317 A * | 3/1977 | Reidelbach | B60J 5/0458 |
| | | | 296/146.6 |
| 5,599,057 A * | 2/1997 | Hirahara | B60J 5/0437 |
| | | | 296/146.6 |
| 6,302,473 B1 * | 10/2001 | Weber | B60J 5/0443 |
| | | | 296/146.6 |

(Continued)

FOREIGN PATENT DOCUMENTS

| | | |
|---|---|---|
| EP | 1 254 797 A1 | 11/2002 |
| FR | 2 698 322 A1 | 5/1994 |

(Continued)

*Primary Examiner* — Glenn Dayoan
*Assistant Examiner* — Paul Chenevert
(74) *Attorney, Agent, or Firm* — Oblon, McClelland, Maier & Neustadt, L.L.P.

(57) ABSTRACT

A step portion that is farther toward a vehicle width direction outside than a cabin inside vertical wall portion, is set on a door inner panel. A portion of the step portion is a first overlapping portion that is arranged in a position overlapping with an outside vertical wall portion of a center pillar in a vehicle side view. A portion of the outside vertical wall portion of the center pillar is a second overlapping portion that faces the first overlapping portion at a distance that is narrower than a distance between the step portion and the cabin inside vertical wall portion. A third overlapping portion that is connected to the first overlapping portion in a position overlapping with the second overlapping portion of the center pillar in the vehicle side view, is set on an end portion of a beltline reinforcement in a length direction thereof.

9 Claims, 16 Drawing Sheets

(56) References Cited

U.S. PATENT DOCUMENTS

| | | | | |
|---|---|---|---|---|
| 7,631,925 B2 * | 12/2009 | Tanaka | ................. | B60J 1/17 |
| | | | | 296/146.2 |
| 8,231,167 B2 * | 7/2012 | Endo | ................. | B60J 5/0437 |
| | | | | 296/146.6 |
| 8,382,195 B2 * | 2/2013 | Iwase | ................. | B62D 25/025 |
| | | | | 296/187.12 |
| 8,690,230 B2 * | 4/2014 | Suzaki | ................. | B62D 25/081 |
| | | | | 296/192 |
| 9,266,412 B2 * | 2/2016 | Fujihara | ................. | B60J 5/0443 |
| 2002/0153742 A1 | 10/2002 | Ishikawa | | |
| 2003/0006625 A1 * | 1/2003 | Moriyama | ................. | B60J 5/0412 |
| | | | | 296/146.6 |
| 2008/0315619 A1 | 12/2008 | Oka | | |
| 2010/0225141 A1 * | 9/2010 | Mori | ................. | B60J 5/0429 |
| | | | | 296/146.6 |

FOREIGN PATENT DOCUMENTS

| | | | |
|---|---|---|---|
| FR | 3002189 A1 * | 8/2014 | ............ B60J 5/0425 |
| JP | 8-2438 | 1/1996 | |
| JP | 10-250370 | 9/1998 | |
| JP | 2002-316536 A | 10/2002 | |
| JP | 2002-347441 | 12/2002 | |
| JP | 2006-56339 A | 3/2006 | |
| JP | 2007-216831 | 8/2007 | |
| JP | 2009-1181 A | 1/2009 | |
| JP | 2009-262868 | 11/2009 | |

\* cited by examiner

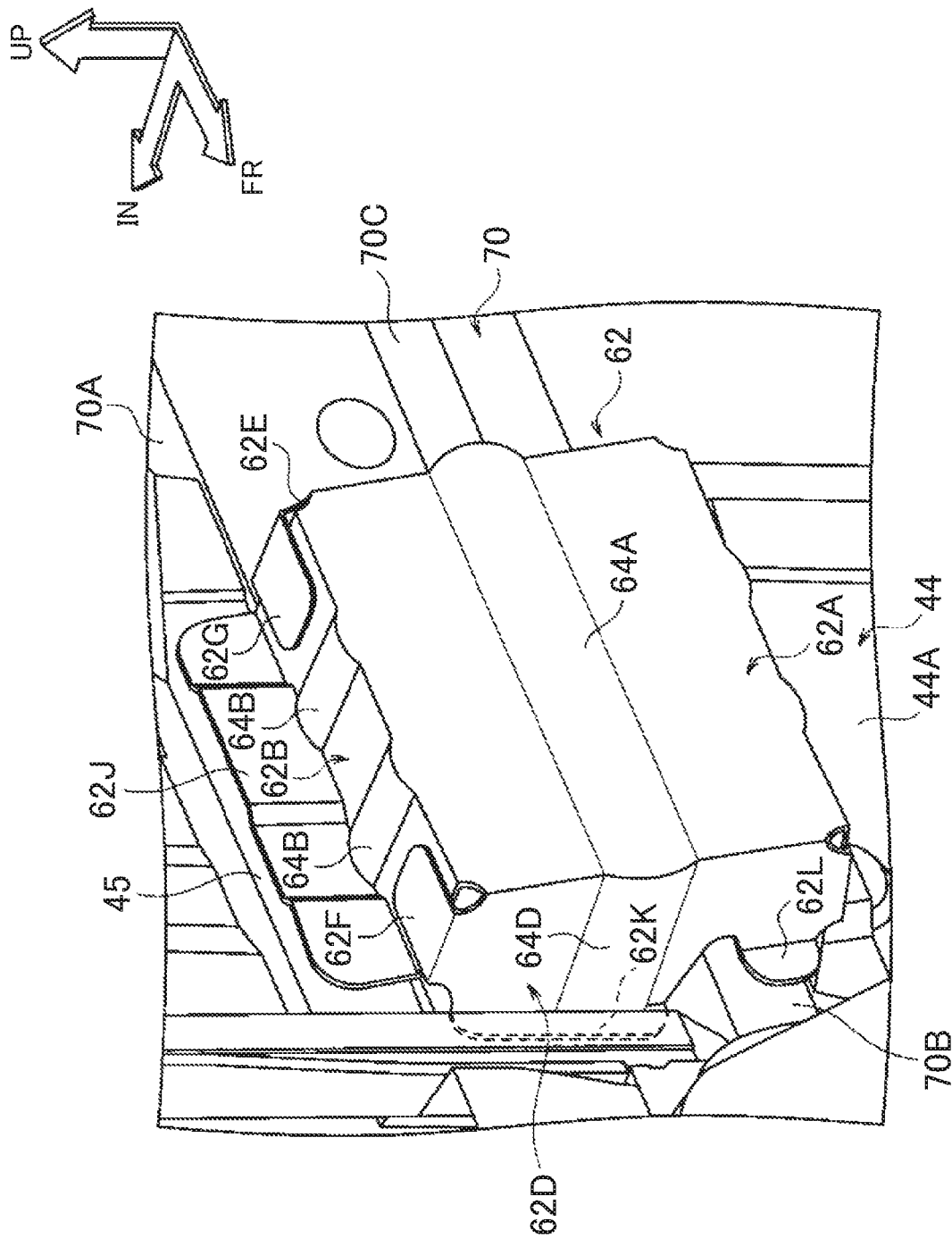

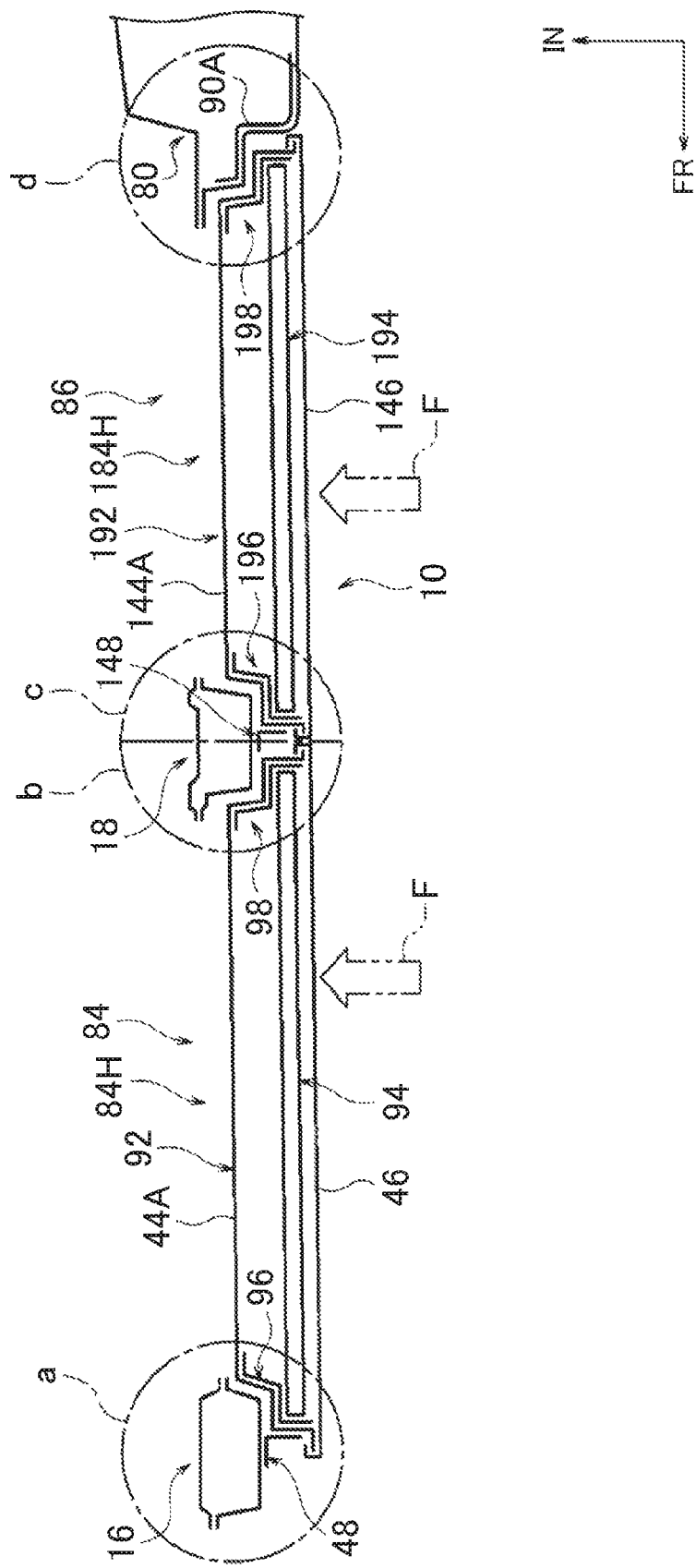

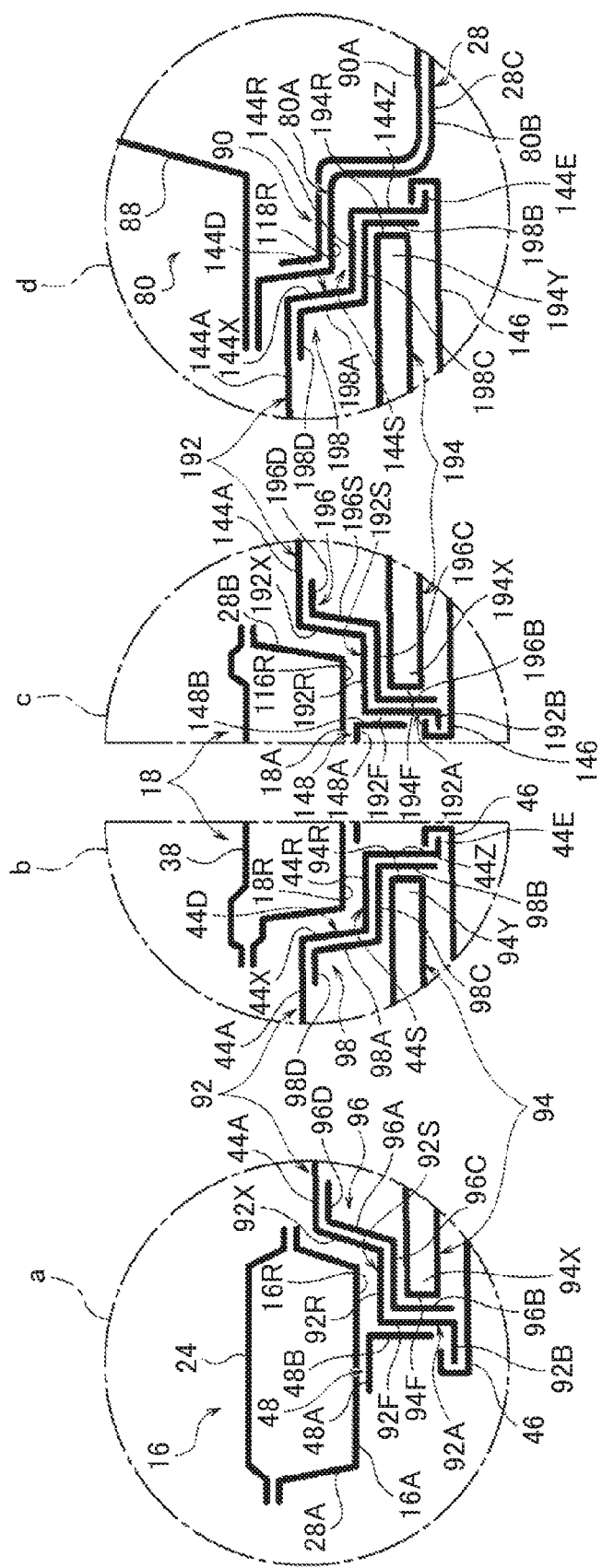

VEHICLE SIDE STRUCTURE

INCORPORATION BY REFERENCE

The disclosure of Japanese Patent Application No. 2014-240530 filed on Nov. 27, 2014 including the specification, drawings and abstract is incorporated herein by reference in its entirety.

BACKGROUND OF THE INVENTION

1. Field of the Invention

The invention relates to a vehicle side structure.

2. Description of Related Art

A structure in which a reinforcing member is arranged along a beltline of a vehicle side door is well-known (see Japanese Patent Application Publication No. 8-2438 (JP 8-2438 A), Japanese Patent Application Publication No. 10-250370 (JP 10-250370 A), Japanese Patent Application Publication No. 2007-216831 (JP 2007-216831 A), Japanese Patent Application Publication No. 2002-347441 (JP 2002-347441 A), and Japanese Patent Application Publication No. 2009-262868 (JP 2009-262868 A)). For example, JP 8-2438 A describes a structure in which two waist reinforcements are joined to a waist portion of a front door. In brief, the structure is such that a first waist reinforcement is joined to a surface on a vehicle width direction outside of a general portion of a door inner panel, and a second waist reinforcement is joined to a surface on a vehicle width direction inside of a general portion of a door outer panel. With this kind of structure, a load input to the front door from the vehicle front side when a frontal collision occurs is transmitted toward the rear side of the front door via the two waist reinforcements.

JP 8-2438 A describes the arrangement relationship between a center pillar and rear end portions of the first waist reinforcement and the second waist reinforcement. For example, the rear end portion of the first waist reinforcement does not overlap with a closed sectional portion of the center pillar in a vehicle side view. Therefore, when a side collision occurs, the collision load is fundamentally unable to be transmitted from the rear end portion of the first waist reinforcement to the closed sectional portion of the center pillar. Also, even though the rear end portion of the second waist reinforcement overlaps with the closed sectional portion of the center pillar in a vehicle side view, this rear end portion of the second waist reinforcement is far to the vehicle width direction outside from the closed sectional portion of the center pillar. Therefore, if the second waist reinforcement bends toward the vehicle width direction inside when a side collision occurs, such that the rear end portion of the second waist reinforcement is displaced farther toward the vehicle front side than the center pillar in a vehicle side view, the collision load is unable to be transmitted from the rear end portion of the second waist reinforcement to the closed sectional portion of the center pillar.

Therefore, with the structure described in the related art above, there is room for improvement in terms of inhibiting deformation of a beltline portion (a door panel upper end portion that includes the beltline) of a side door when a side collision occurs.

SUMMARY OF THE INVENTION

The invention thus provides a vehicle side structure capable of inhibiting deformation of a beltline portion of a side door when a side collision occurs.

One aspect of the invention thus relates to a vehicle side structure that includes a pillar that is arranged in a vehicle up and down direction on an edge side of a door opening of a vehicle side portion, and that includes an outside vertical wall portion that extends in the vehicle up and down direction and a vehicle front-rear direction on a portion on a vehicle width direction outside; a side door that includes a door inner panel that opens and closes the door opening, and is arranged on a vehicle cabin inside, and a door outer panel that is arranged to a vehicle cabin outside of the door inner panel and, together with the door inner panel, forms a door main body portion; and a beltline reinforcement that is arranged with the vehicle front-rear direction as a length direction along a beltline inside the door main body portion, and that has a sectional shape orthogonal to the length direction, which is formed in a hat-shape or closed sectional shape along an entire length in the length direction. A first overlapping portion that forms a portion of a step portion farther to the vehicle width direction outside than a cabin inside vertical wall portion that forms a door inside surface, and that is arranged in a position overlapping with the outside vertical wall portion in a vehicle side view, is formed on an end portion of the door inner panel in the vehicle front-rear direction. A portion of the outside vertical wall portion is a second overlapping portion that faces the first overlapping portion at a distance that is narrower than a distance between the step portion and the cabin inside vertical wall portion. A third overlapping portion that is connected to the first overlapping portion in a position overlapping with the second overlapping portion in a vehicle side view, is set on an end portion of the beltline reinforcement in the length direction.

According to this structure, when a side collision occurs, the door outer panel deforms toward the vehicle width direction inside from the collision load at that time. Also, because the beltline reinforcement is arranged with the vehicle front-rear direction as the length direction along the beltline inside the door main body portion, the beltline reinforcement is pushed toward the vehicle width direction inside via the door outer panel.

Here, in the invention, the first lap portion is formed on an end portion of the door inner panel in the vehicle front-rear direction. This first lap portion forms a portion of a step portion farther to the vehicle width direction outside than a cabin inside vertical wall portion that forms a door inside surface, and is arranged in a position overlapping with the outside vertical wall portion in a vehicle side view. Also, a portion of the outside vertical wall portion of the pillar is a second overlapping portion that faces the first overlapping portion at a distance that is narrower than the distance between the step portion and the cabin inside vertical wall portion, and a third overlapping portion that is set on an end portion of the beltline reinforcement in the length direction is connected to the first overlapping portion in a position overlapping with the second overlapping portion in a vehicle side view. Therefore, the collision load when a side collision occurs is transmitted from the door outer panel to the first overlapping portion of the door inner panel via the third overlapping portion of the beltline reinforcement, and then transmitted from the first overlapping portion of the door inner panel to the second overlapping portion of the pillar.

Also, the displacement amount in the vehicle width direction of the third overlapping portion of the beltline reinforcement until the third overlapping portion is supported by the second overlapping portion of the pillar via the first overlapping portion of the door inner panel is equivalent to the distance set between the first overlapping portion of the door inner panel and the second overlapping portion of the pillar, and is thus kept to a minimum. Therefore, the third overlapping portion is supported by the second overlapping portion of the pillar via the first overlapping portion of the door inner panel before the beltline reinforcement bends much to the vehicle width direction inside by the collision load. Furthermore, because the third overlapping portion is connected to the first overlapping portion of the door inner panel, even if the beltline reinforcement tries to bend toward the vehicle width direction inside from the collision load, relative displacement of the third overlapping portion with respect to the first overlapping portion is suppressed.

As described above, when a side collision occurs, the third overlapping portion of the beltline reinforcement is supported by the second overlapping portion of the pillar via the first overlapping portion of the door inner panel before the beltline reinforcement bends much, and even if the beltline reinforcement does try to bend, relative displacement of the third overlapping portion with respect to the first overlapping portion is suppressed, so displacement of the beltline reinforcement toward the vehicle width direction inside is able to be effectively suppressed.

Moreover, the beltline reinforcement has a sectional shape orthogonal to the length direction that is a hat-shape or closed sectional shape along the entire length in the length direction, so localized deformation of the beltline reinforcement when a side collision occurs is able to be suppressed. Therefore, when a side collision occurs, the collision load is effectively transmitted from the third overlapping portion of the beltline reinforcement to the second overlapping portion of the pillar via the first overlapping portion of the door inner panel, and the beltline reinforcement is stably supported by the pillar.

The vehicle side structure may be applied to a vehicle in which an instrument panel reinforcement is arranged with a vehicle width direction as a length direction, between a front end portion of each of a left and right front side door as the side door in the vehicle front-rear direction, and an end portion of the instrument panel reinforcement in the length direction is set on a vehicle rear side of a front pillar as the pillar, and is fixed to the front pillar via a connecting portion. The first overlapping portion may be formed on a rear end portion of the door inner panel in the vehicle front-rear direction, and a portion of the outside vertical wall portion of a center pillar as the pillar may be the second overlapping portion, and the third overlapping portion may be set on a rear end portion of the beltline reinforcement in the vehicle front-rear direction. Also, a load transmitting member may be interposed between the beltline reinforcement and the door inner panel, on a front end portion of the front side door in the vehicle front-rear direction, and the load transmitting member may be arranged in a position overlapping with an end portion of the instrument panel reinforcement on the vehicle width direction outside in a vehicle side view.

According to this structure, some of the collision load at the time of a side collision is transmitted from the door outer panel to the first overlapping member of the door inner panel via the third overlapping portion of the beltline reinforcement, on the rear end portion side of the front side door in the vehicle front-rear direction, and then transmitted from the first overlapping portion of the door inner panel to the second overlapping portion of the center pillar.

Also, some of the collision load at the time of a side collision is transmitted from the door outer panel to the load transmitting member via the front end portion of the beltline reinforcement in the vehicle front-rear direction, on the front end portion side of the front side door in the vehicle front-rear direction, and then transmitted from the load transmitting member to the end portion of the instrument panel reinforcement on the vehicle width direction outside via the front end portion of the door inner panel in the vehicle front-rear direction. The load transmitted to the instrument panel reinforcement is then transmitted to the vehicle side portion side that is on the side opposite the collision side, and transmitted to the front pillar via the connecting portion.

That is, when a side collision occurs, the rear end portion of the beltline reinforcement in the vehicle front-rear direction is supported by the center pillar, and the front end portion of the beltline reinforcement in the vehicle front-rear direction is supported by a vehicle body component that includes the instrument panel reinforcement and the front pillar. Also, a load transmission path for both end portions of the beltline reinforcement in the vehicle front-rear direction is ensured, so even if the beltline reinforcement receives an impact when a side collision occurs, both end portions of the beltline reinforcement in the vehicle front-rear direction are inhibited from moving toward the vehicle width direction inside. As a result, displacement and deformation of the beltline reinforcement when a side collision occurs are able to be more effectively suppressed.

In the vehicle side structure described above, the first overlapping portion may be formed on both end portions of the door inner panel in the vehicle front-rear direction, the second overlapping portion may be set on both of the pillars arranged one on each of a front and rear edge side of the door opening, and the third overlapping portion may be set on both end portions of the beltline reinforcement in the length direction.

According to this structure, when a side collision occurs, both end portions of the beltline reinforcement in the length direction are supported by the pillars, so deformation of the beltline reinforcement is able to be even more effectively suppressed.

In the vehicle side structure described above, the beltline reinforcement may be arranged on the vehicle width direction outside inside the door main body portion, and an end portion of the beltline reinforcement in the vehicle front-rear direction may be connected to the door inner panel via a bracket. Also, the bracket may include a first wall portion that forms a portion of the bracket on a vehicle width direction inside, and is connected to a front-rear facing wall portion that is a portion of the end portion of the door inner panel in the vehicle front-rear direction that faces the pillar in the vehicle front-rear direction, and a second wall portion that forms a portion of the bracket on the vehicle width direction outside, and is connected to an end surface of the end portion of the beltline reinforcement in the vehicle front-rear direction that faces in the vehicle front-rear direction.

According to this structure, the pillar, the front-rear facing wall portion of the door inner panel, and the first wall portion of the bracket are all arranged overlapping in the vehicle front-rear direction, and the first wall portion of the bracket is connected to the front-rear facing wall portion of the door inner panel. Therefore, when a frontal collision occurs, collision force is nicely transmitted between the pillar, the front-rear facing wall portion of the door inner panel, and the first wall portion of the bracket. Also, the second wall portion of the bracket is connected to the end surface of the beltline reinforcement in the vehicle front-rear direction, which faces in the vehicle front-rear direction. Therefore, when a frontal collision occurs, the collision load is nicely transmitted between the second wall portion of the bracket, and the end surface of the beltline reinforcement. As a result, when a frontal collision occurs, the collision load is nicely transmitted between the beltline reinforcement and the pillar via the bracket.

In the vehicle side structure described above, the bracket may include a connecting wall portion that connects the first wall portion to the second wall portion, the connecting wall portion being connected to the first overlapping portion of the door inner panel, and connected to the third overlapping portion of the beltline reinforcement.

According to this structure, even if the bracket is interposed between the door inner panel and the beltline reinforcement, when a side collision occurs, the displacement amount in the vehicle width direction of the third overlapping portion of the beltline reinforcement until the third overlapping portion is supported by the second overlapping portion of the pillar is able to be kept to a minimum.

The vehicle side structure described above may also include a front side door and a rear side door as the side door; a front beltline reinforcement as the beltline reinforcement that is provided on the front side door; and a rear beltline reinforcement as the beltline reinforcement that is provided on the rear side door. A rear end portion of the front beltline reinforcement and a front end portion of the rear beltline reinforcement may be arranged in positions farther toward the vehicle width direction outside than a center pillar as the pillar, and in positions overlapping in a vehicle front view.

According to this structure, when the front beltline reinforcement moves backwards from the collision load when a frontal collision occurs, the rear end portion of the front beltline reinforcement bumps into the front end portion of the rear beltline reinforcement via a portion of the door main body portion at a position farther toward the vehicle width direction outside than the center pillar. Therefore, when a frontal collision occurs, the load that deforms the center pillar is reduced, and the collision load is able to be transmitted toward the vehicle rear side while inhibiting deformation of the door opening.

In the vehicle side structure described above, on a rear end portion of a rear side door as the side door in the vehicle front-rear direction, the first overlapping portion may be formed on a rear end portion of the door inner panel in the vehicle front-rear direction, and the third overlapping portion may be set on a rear end portion of the beltline reinforcement in the vehicle front-rear direction. Also, a reinforcing portion that reinforces a portion overlapping with the first overlapping portion in a vehicle side view may be set on a quarter pillar as the pillar.

According to this structure, some of the collision load at the time of a side collision is transmitted from the door outer panel to the first overlapping portion of the door inner panel via the third overlapping portion of the beltline reinforcement, on the rear end portion side of the rear side door in the vehicle front-rear direction, and then transmitted from the first overlapping portion of the door inner panel to the second overlapping portion of the quarter pillar. Here, a reinforcing portion that reinforces a portion overlapping with the first overlapping portion in a vehicle side view is set on the quarter pillar, so even if the second overlapping portion of the quarter pillar supports the first overlapping portion of the door inner panel when a side collision occurs, deformation of the quarter pillar is inhibited. As a result, deformation of the rear portion of the rear side door when a side collision occurs is effectively inhibited.

As described above, the vehicle side structure of the invention has a beneficial effect of being able to inhibit deformation at a beltline of a side door when a side collision occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5B is an enlarged perspective view of the load transmitting member, a portion of which is shown in FIG. 4, in an attached state, viewed at an angle from the upper front in the vehicle front-rear direction;

FIG. 9A is an enlarged top sectional view of the vehicle side structure taken along line 9-9 in FIG. 8;

FIG. 9B is a partial enlarged view of portions a, b, c, and d of FIG. 9A;

DETAILED DESCRIPTION OF EMBODIMENTS

First Example Embodiment

Figure 1:
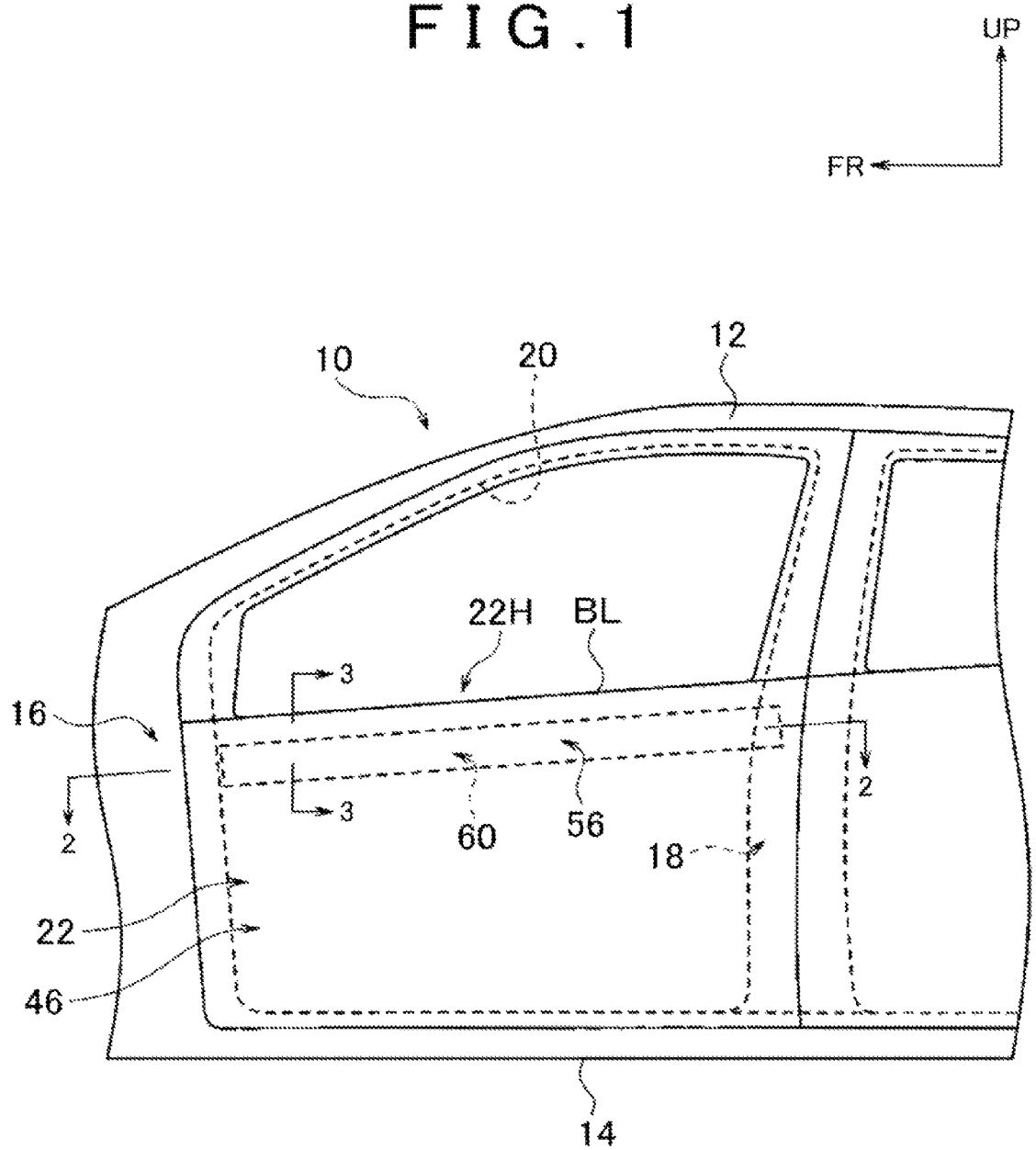
FIG. 1 is a side view of a portion of a vehicle to which a vehicle side structure according to a first example embodiment of the invention has been applied.

A vehicle side structure according to a first example embodiment of the invention will now be described with reference to FIGS. 1 to 6. In the drawings, the arrow FR indicates forward in a vehicle front-rear direction, the arrow UP indicates upward in a vehicle up and down direction, and the arrow IN indicates inward in a vehicle width direction.

FIG. 1 is a side view of a portion of a vehicle to which the vehicle side structure according to this example embodiment has been applied. As shown in the drawing, a roof side rail 12 is arranged on an upper portion of a vehicle side portion 10. The roof side rail 12 extends in the vehicle front-rear direction. On the other hand, a rocker 14 is arranged on a lower portion of the vehicle side portion 10. The rocker 14 extends in the vehicle front-rear direction. Also, a front pillar 16 as a pillar is provided extending upward in the vehicle up and down direction from a front end portion of the rocker 14. An upper end portion of the front pillar 16 is connected to a front end portion of the roof side rail 12. Furthermore, a center pillar 18 as a pillar is provided extending upward in the vehicle up and down direction from a middle portion of the rocker 14 in the length direction. An upper end portion of the center pillar 18 is connected to a middle portion of the roof side rail 12 in the length direction. FIG. 1 is a view showing a vehicle side portion from the front pillar 16 to slightly to the vehicle rear side of the center pillar 18.

The roof side rail 12, the rocker 14, the front pillar 16, and the center pillar 18 described above are all closed sectional structures that form a vehicle body frame member. Also, a front door opening 20 as a door opening that is surrounded by the roof side rail 12, the front pillar 16, the rocker 14, and the center pillar 18, is formed in a front portion side of the vehicle side portion 10. In other words, the roof side rail 12 is arranged in the vehicle front-rear direction on an upper edge side of the front door opening 20, and the rocker 14 is arranged in the vehicle front-rear direction on a lower edge side of the front door opening 20. Also, the front pillar 16 is arranged in the vehicle up and down direction on a front edge side of the front door opening 20, and the center pillar 18 is arranged in the vehicle up and down direction on a rear edge side of the front door opening 20. The front door opening 20 communicates the outside of a vehicle cabin with the inside of the vehicle cabin, and is opened and closed by a front side door 22 as a side door.

Figure 2:
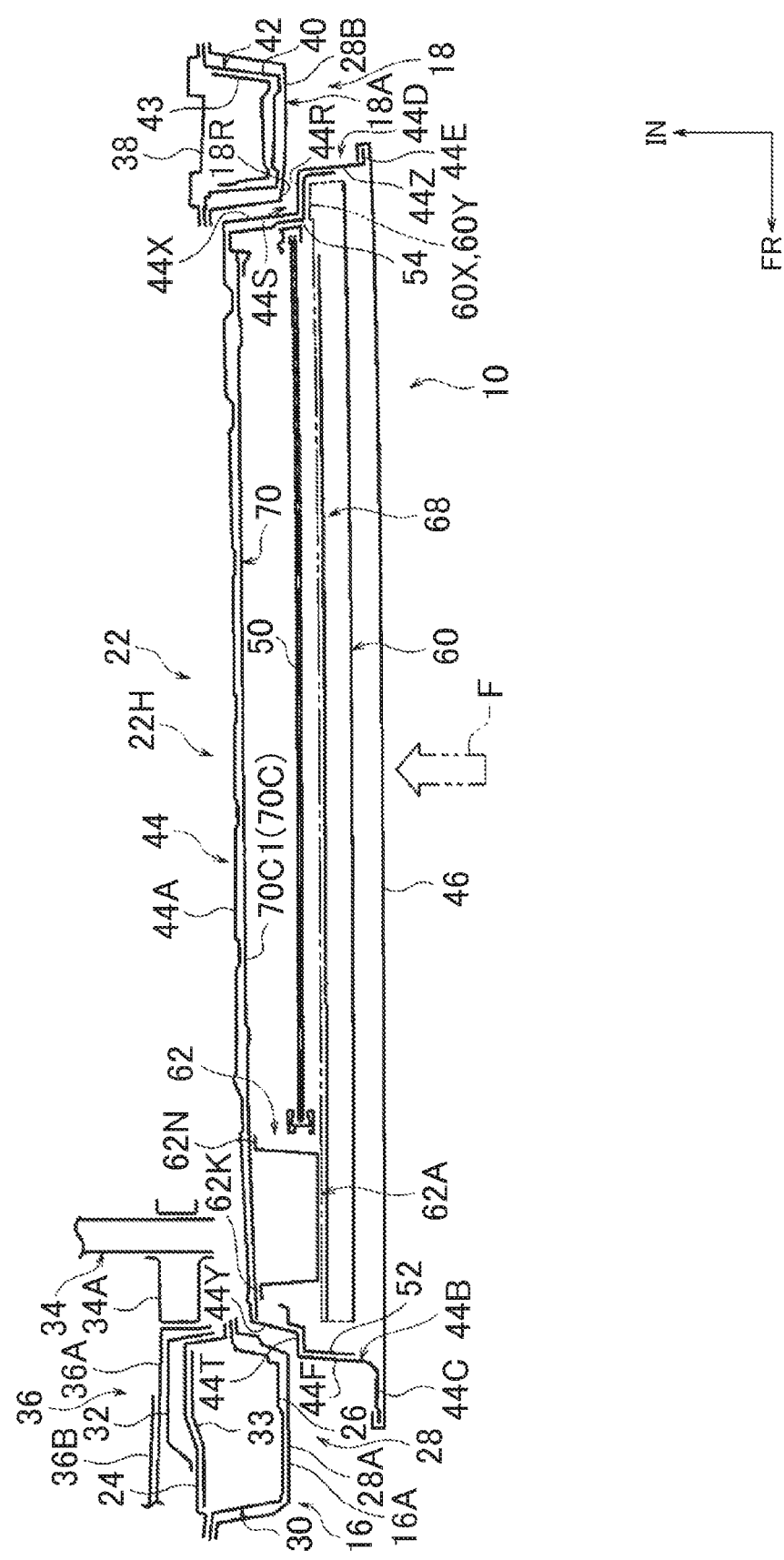
FIG. 2 is an enlarged top sectional view of the vehicle side structure taken along line 2-2 in FIG. 1.

FIG. 2 is an enlarged top sectional view of the vehicle side structure taken along line 2-2 in FIG. 1. In FIG. 2, the cross-sections of the members are indicated by thin bold lines in order to show the general structure of all of the main portions of the vehicle side portion 10, and portions where members contact one another are shown slightly separated to make the drawing easier to see.

As shown in FIG. 2, the front pillar 16 includes a front pillar inner panel 24 arranged on a vehicle cabin inside, and a front pillar reinforcement 26 arranged to the vehicle cabin outside of this front pillar reinforcement 26. In the description below, the front pillar reinforcement 26 will be abbreviated to "front pillar RF 26".

The front pillar inner panel 24 is formed in a general hat-shape that is open towards the vehicle width direction outside in a top sectional view, and the front pillar RF 26 is formed in a general hat-shape that is open towards the vehicle width direction inside in a top sectional view. Also, front and rear flange portions of the front pillar inner panel 24 and the front pillar RF 26 are joined together, thus forming a frame portion 30 that has a closed sectional shape and extends in substantially the vehicle up and down direction.

A front pillar outer portion 28A that is a portion of a side outer panel 28 is arranged on the vehicle cabin outside of the front pillar RF 26, and forms a portion of the front pillar 16. The front pillar outer portion 28A is formed in a general hat-shape that is open towards the vehicle width direction inside in a top sectional view, and front and rear flange portions thereof are joined to the front and rear flange portions of the front pillar inner panel 24 and the front pillar RF 26. Also, the front pillar 16 includes an outside vertical wall portion 16A that extends in the vehicle up and down direction and the vehicle front-rear direction on a portion on the vehicle width direction outside that is formed by a portion of the front pillar outer portion 28A.

A reinforcing panel 32 that is joined to the front pillar inner panel 24 and forms a closed sectional portion with the front pillar inner panel 24 is arranged to the vehicle cabin inside of the front pillar inner panel 24. Also, a reinforcing panel 33 that is joined to the front pillar inner panel 24 is arranged inside the cross-section of the frame portion 30.

An instrument panel reinforcement 34 (hereinafter, abbreviated to "instrument panel RF 34") is arranged with the vehicle width direction as the length direction, between front end portions in the vehicle front-rear direction of the left and right front side doors 22 farther toward the vehicle rear side than the front pillar 16. The instrument panel RF 34 is an extremely strong, highly rigid member formed by a pipe-shaped member that retains a steering mechanism, not shown. An end portion of the instrument panel RF 34 in the length direction is set to the vehicle rear side of the front pillar 16.

Figure 6:
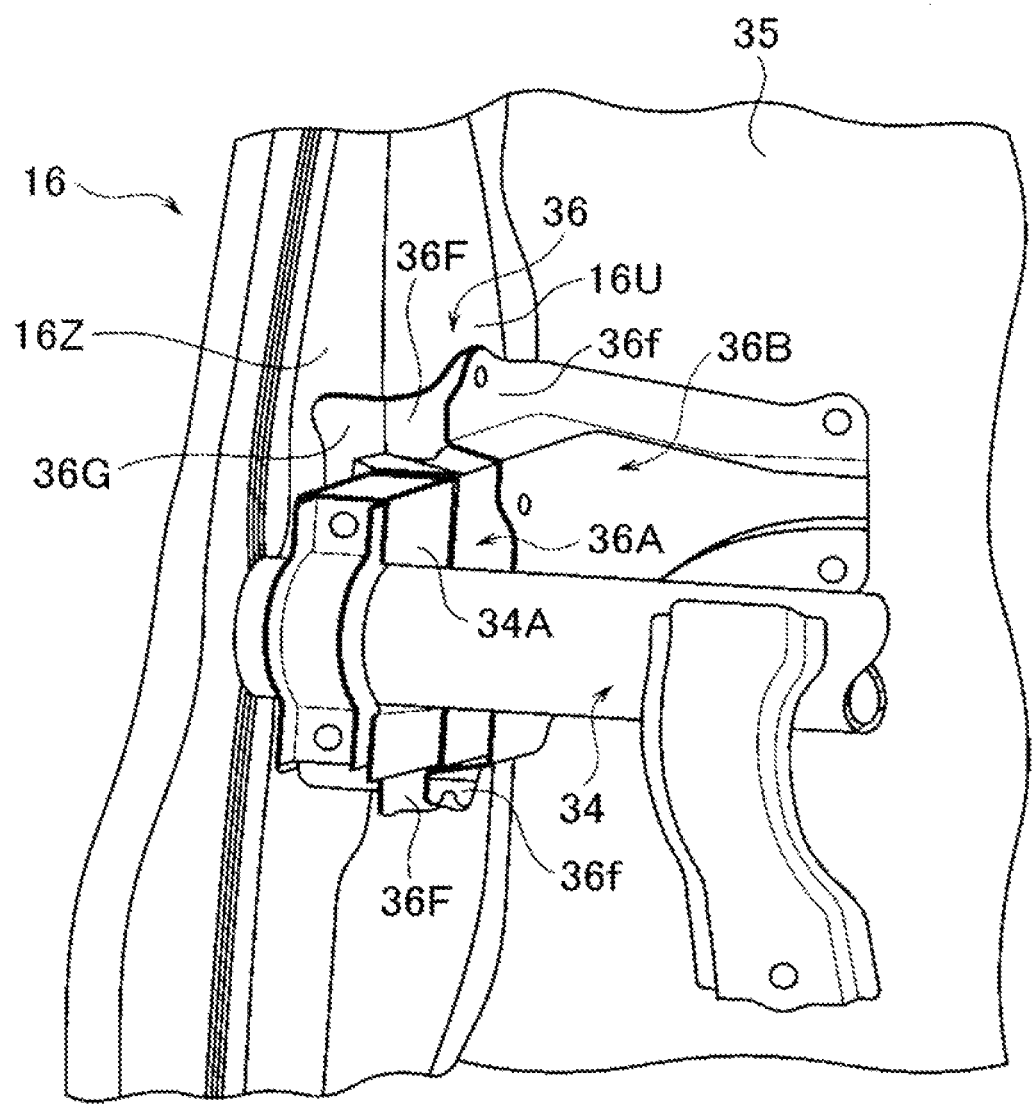
FIG. 6 is a perspective view of an end portion of an instrument panel reinforcement in a length direction fixed to a front pillar shown in FIG. 1 via a connecting portion.

FIG. 6 is a perspective view from a vehicle rear side, of the end portion of the instrument panel RF 34 in a length direction fixed to the front pillar 16 via a connecting portion 36. As shown in FIG. 6, a box-shaped mounting bracket 34A that protrudes toward the vehicle front side is provided on the end portion of the instrument panel RF 34 in the length direction. A rear wall portion of a first gusset 36A that is arranged on a vehicle front side of the mounting bracket 34A is fixed by bolt fastening to the mounting bracket 34A. The first gusset 36A extends toward the vehicle front side along a vehicle width direction inside surface 16U of the front pillar 16, and a front end side of the first gusset 36A curves toward the vehicle width direction inside. A large portion of the first gusset 36A overlaps with a second gusset 36B that will be described later, so only a portion of the first gusset 36A is shown exposed in FIG. 6. The shape of the concealed portion of the first gusset 36A is generally the same shape as the second gusset 36B. The sectional shape of the first gusset 36A that is orthogonal to the length direction of the first gusset 36A is a general hat-shape that is open toward the vehicle cabin outside.

As shown in FIGS. 2 and 6, the second gusset 36B is arranged on the vehicle cabin inside of the first gusset 36A. The second gusset 36B extends in the length direction of the first gusset 36A, and has a sectional shape orthogonal to the length direction of the second gusset 36B that is a general hat-shape that is open toward the vehicle outside. As shown in FIG. 6, upper and lower flange portions 36F of the first gusset 36A and upper and lower flange portions 36f of the second gusset 36B are overlapped with and joined by fastening and welding to a vehicle width direction inside portion of the front pillar 16 and a vehicle cabin front wall portion (dash portion) 35. Also, a rear flange portion 36G that extends toward the vehicle width direction outside on a rear end portion of the first gusset 36A is joined by welding to a rear surface 16Z of the front pillar 16. As a result, the end portion of the instrument panel RF 34 in the length direction is fixed to the front pillar 16 via the connecting portion 36 that is formed by the first gusset 36A and the second gusset 36B.

Meanwhile, as shown in FIG. 2, the center pillar 18 includes a center pillar inner panel 38 arranged on the vehicle cabin inside, and a center pillar reinforcement 40 arranged to the vehicle cabin outside of the center pillar inner panel 38. In the description below, the center pillar reinforcement 40 will be abbreviated to "center pillar RF 40".

The center pillar inner panel 38 is slightly recessed and protruding in the vehicle width direction in a top sectional view, but is overall formed as a member that extends in the vehicle front-rear direction. On the other hand, the center pillar RF 40 is formed in a general hat-shape that is open toward the vehicle width direction inside in a top sectional view. Also, a frame portion 42 that has a closed sectional shape and extends in substantially the vehicle up and down direction is formed by the front and rear flange portions of the center pillar RF 40 being joined to the center pillar inner panel 38.

A center pillar outer portion 28B that is a portion of the side outer panel 28 is arranged to the vehicle cabin outside of the center pillar RF 40 and forms a portion of the center pillar 18. The center pillar outer portion 28B is formed in a general hat-shape that is open towards the vehicle width direction inside in a top sectional view, and front and rear flange portions thereof are joined to the front and rear flange portions of the center pillar inner panel 38 and the center pillar RF 40. Also, the center pillar 18 includes an outside vertical wall portion 18A that extends in the vehicle up and down direction and the vehicle front-rear direction on a portion on the vehicle width direction outside that is formed by a portion of the center pillar outer portion 28B. Also, a reinforcing panel 43 that is joined to an inside surface side of the center pillar RF 40 is arranged inside of the cross-section of the frame portion 42.

A portion of the front side door 22 when the front side door 22 is closed, is arranged between the front pillar 16 and the center pillar 18. The front side door 22 includes a door main body portion 22H that is formed by a door inner panel 44 that is arranged on the vehicle cabin inside and forms a door inner panel, and a door outer panel 46 that is arranged to the vehicle cabin outside of this door inner panel 44 and forms a door outer panel. A door glass 50 that is able to be raised and lowered is arranged inside of the door main body portion 22H.

The door inner panel 44 includes a cabin inside vertical wall portion 44A that extends in the vehicle front-rear direction and the vehicle up and down direction and forms a door inside surface. This cabin inside vertical wall portion 44A is covered from the vehicle cabin inside by a door trim, not shown.

A front end portion of the door inner panel 44 in the vehicle front-rear direction includes a front side vertical wall portion 44B that curves toward the vehicle width direction outside from a front end portion of the cabin inside vertical wall portion 44A, and is arranged between the front end portion of the cabin inside vertical wall portion 44A and near the front end portion of the door outer panel 46. This front side vertical wall portion 44B is formed in a general crank-shape in a top sectional view, and has a front-rear facing wall portion 44Y that faces the front pillar 16 in the vehicle front-rear direction, and a step portion 44T that is farther to the vehicle width direction outside than the cabin inside vertical wall portion 44A. Also, a front wall portion 44F that curves toward the vehicle width direction outside is formed extending from the front end portion of the step portion 44T on the front side vertical wall portion 44B. A front side flange portion 44C that curves toward the vehicle front side is formed from an end portion of this front wall portion 44F on the vehicle width direction outside. A terminal portion of the door outer panel 46 is fixed by hemming to a tip end portion of the front side flange portion 44C.

A hinge reinforcement 52 that is formed by a plate and arranged inside the door main body portion 22H is joined to the front side vertical wall portion 44B of the door inner panel 44. The hinge reinforcement 52 reinforces the door hinge mounting portion of the door inner panel 44. A door hinge, not shown, is mounted to the front pillar 16, and rotatably supports the front side door 22 around an axis in the vehicle up and down direction.

A rear end portion of the door inner panel 44 in the vehicle front-rear direction includes a rear side vertical wall portion 44D that curves toward the vehicle width direction outside from a rear end portion of the cabin inside vertical wall portion 44A, and is arranged between the rear end portion of the cabin inside vertical wall portion 44A and near the rear end portion of the door outer panel 46. The rear side vertical wall portion 44D is formed in a general crank-shape in a top sectional view, and has a front-rear facing wall portion 44X that faces the center pillar 18 in the vehicle front-rear direction, and a step portion 44S that is farther to the vehicle width direction outside than the cabin inside vertical wall portion 44A. A portion of the step portion 44S is a first overlapping portion 44R that is arranged in a position overlapping with the outside vertical wall portion 18A of the center pillar 18 in a vehicle side view. Also, a portion of the outside vertical wall portion 18A of the center pillar 18 is a second overlapping portion 18R that faces the first overlapping portion 44R at a distance that is narrower than the distance between the step portion 44S and the cabin inside vertical wall portion 44A.

Also, a rear wall portion 44Z that extends curving toward the vehicle width direction outside from the rear end portion of the step portion 44S is formed on the rear side vertical wall portion 44D of the door inner panel 44. Furthermore, a rear side flange portion 44E that curves toward the vehicle rear side is formed from the end portion of the rear wall portion 44Z on the vehicle width direction outside. A terminal portion of the door outer panel 46 is fixed by hemming to a tip end portion of the rear side flange portion 44E.

A lock reinforcement 54 (hereinafter, abbreviated to "lock RF 54") that is formed by a plate and arranged inside the door main body portion 22H, is joined to a portion that includes the step portion 44S of the rear side vertical wall portion 44D of the door inner panel 44. The lock RF 54 reinforces a door lock mounting portion of the door inner panel 44. A door lock mechanism, not shown, is able to engage with a striker, not shown, provided on the center pillar 18.

Figure 4:
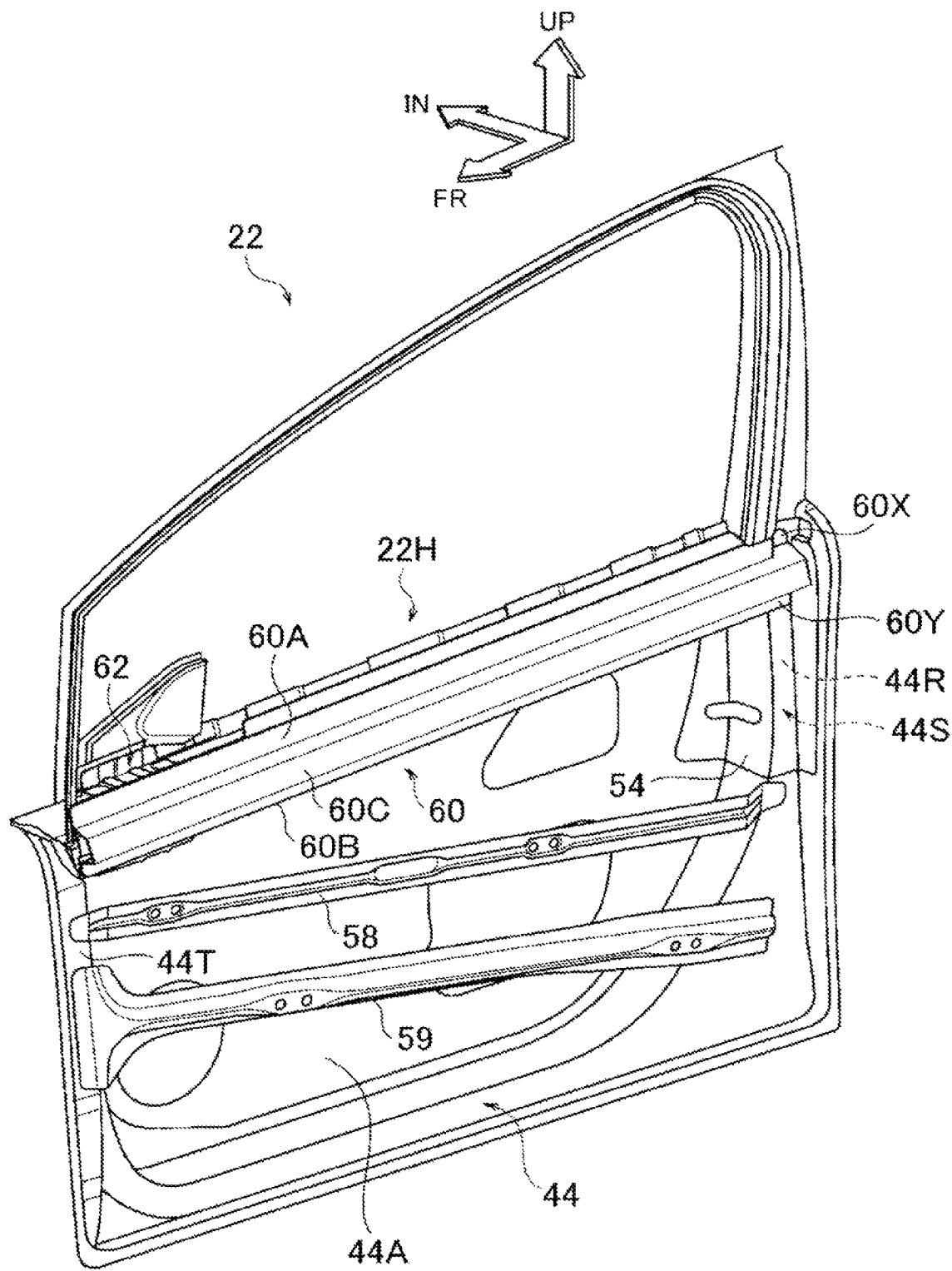
FIG. 4 is a perspective view, from a vehicle width direction outside, of a portion of an inner portion of a front side door shown in FIG. 1.

FIG. 4 is a perspective view from the vehicle width direction outside, of a portion of an inner portion of the front side door 22 with the door outer panel 46 (see FIG. 1) removed. As shown in FIG. 4, two impact beams 58 and 59 made of long plates are arranged with the substantially vehicle front-rear direction as the length direction, on a portion extending from a vertically middle portion to a lower portion, on the vehicle width direction outside of the door inner panel 44. Front end portions of the impact beams 58 and 59 are fixed to the step portion 44T of the door inner panel 44, and rear end portions of the impact beams 58 and 59 are fixed to the step portion 44S of the door inner panel 44.

A beltline reinforcement 60 (hereinafter, abbreviated to "beltline RF 60") is arranged with the vehicle front-rear direction as the length direction along a beltline BL (see FIG. 1) on an upper end portion inside the door main body portion 22H. As shown in FIG. 1, the beltline BL is a line that passes through the upper end of the door main body portion 22H. The beltline RF 60 is an extremely strong and highly rigid member formed by a long plate.

Figure 3:
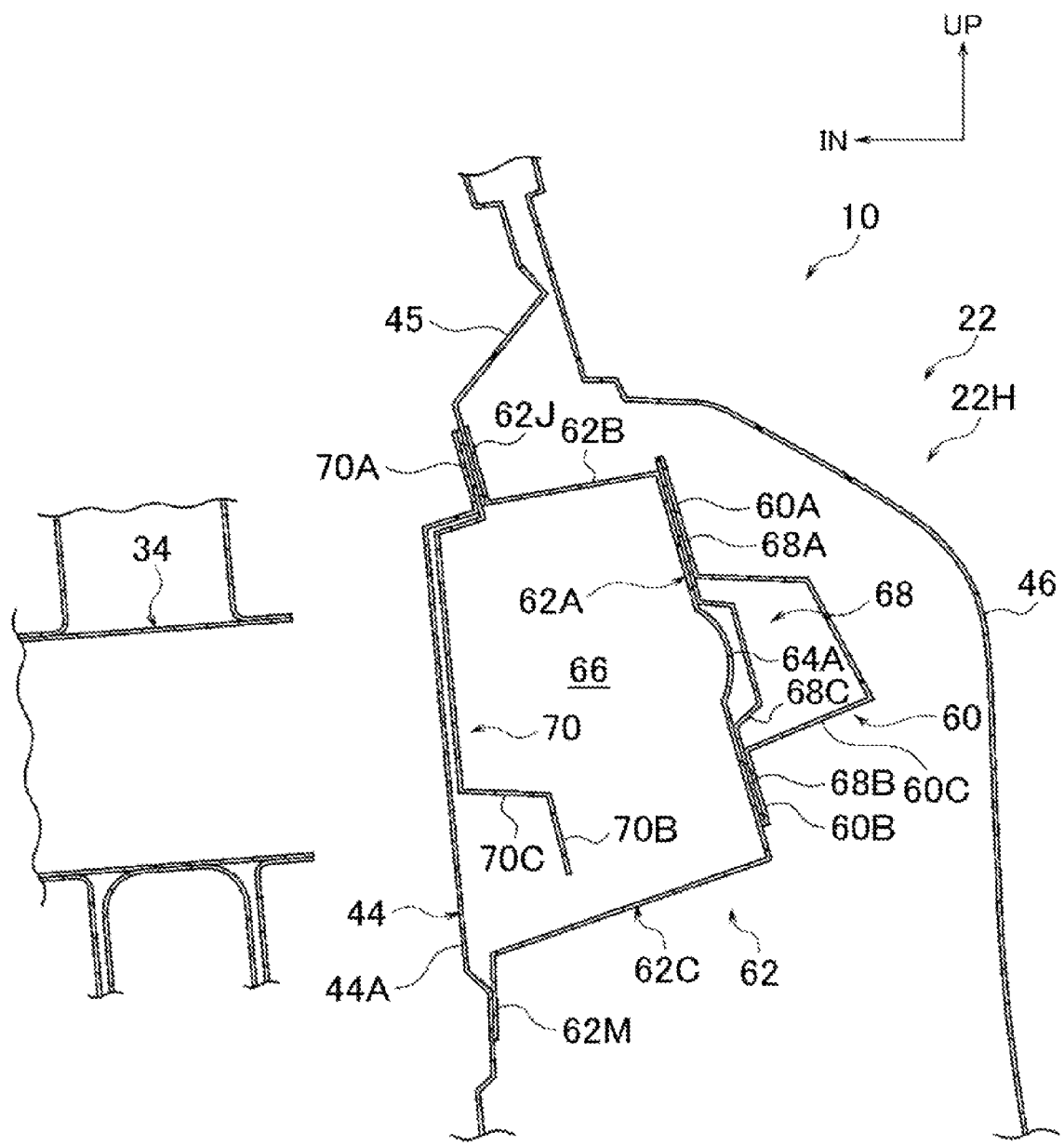
FIG. 3 is an enlarged top sectional view of the vehicle side structure taken along line 3-3 in FIG. 1.

FIG. 3 is an enlarged top sectional view of the vehicle side structure taken along line 3-3 in FIG. 1. FIG. 3 is a view of the vehicle side portion 10 at a higher magnification than FIG. 2. As shown in FIGS. 3 and 4, the beltline RF 60 has a sectional shape orthogonal to the length direction that is a hat-shape along the entire length in the length direction, with the opening pointing towards the vehicle width direction inside. That is, the beltline RF 60 includes a generally U-shaped protruding portion 60C that is open to the vehicle width direction inside, and a pair of upper and lower flange portions, i.e., an upper flange portion 60A and a lower flange portion 60B, that extend in directions away from each other from upper and lower end portions of the protruding portion 60C on the vehicle width direction inside.

As shown in FIG. 2, third overlapping portions 60X and 60Y (see FIG. 4) that are connected to the first overlapping portion 44R in positions overlapping with the second overlapping portion 18R of the center pillar 18 in a vehicle side view, are set on a rear end portion (an end portion in the length direction) of the beltline RF 60 in the vehicle front-rear direction. In FIG. 2, the outer shapes of portions of the beltline RF 60 that are positioned above and below line 2-2 in FIG. 1 (i.e., above and below the location of the cross-section shown in FIG. 2) are shown by a chain double-dashed line in order to facilitate understanding of the structure.

As shown in FIG. 4, the third overlapping portion 60X is a rear end portion of the upper flange portion 60A, and the third overlapping portion 60Y is a rear end portion of the lower flange portion 60B. The third overlapping portions 60X and 60Y overlap with the first overlapping portion 44R via a portion of the lock RF 54, and are connected to these by welding, for example.

Meanwhile, a load transmitting member 62 is interposed between the beltline RF 60 and the door inner panel 44, on a front end portion of the front side door 22 in the vehicle front-rear direction. As shown in FIGS. 2 and 3, the load transmitting member 62 is arranged in a position overlapping with the end portion of the instrument panel RF 34 on the vehicle width direction outside in a vehicle side view.

Figure 5A:
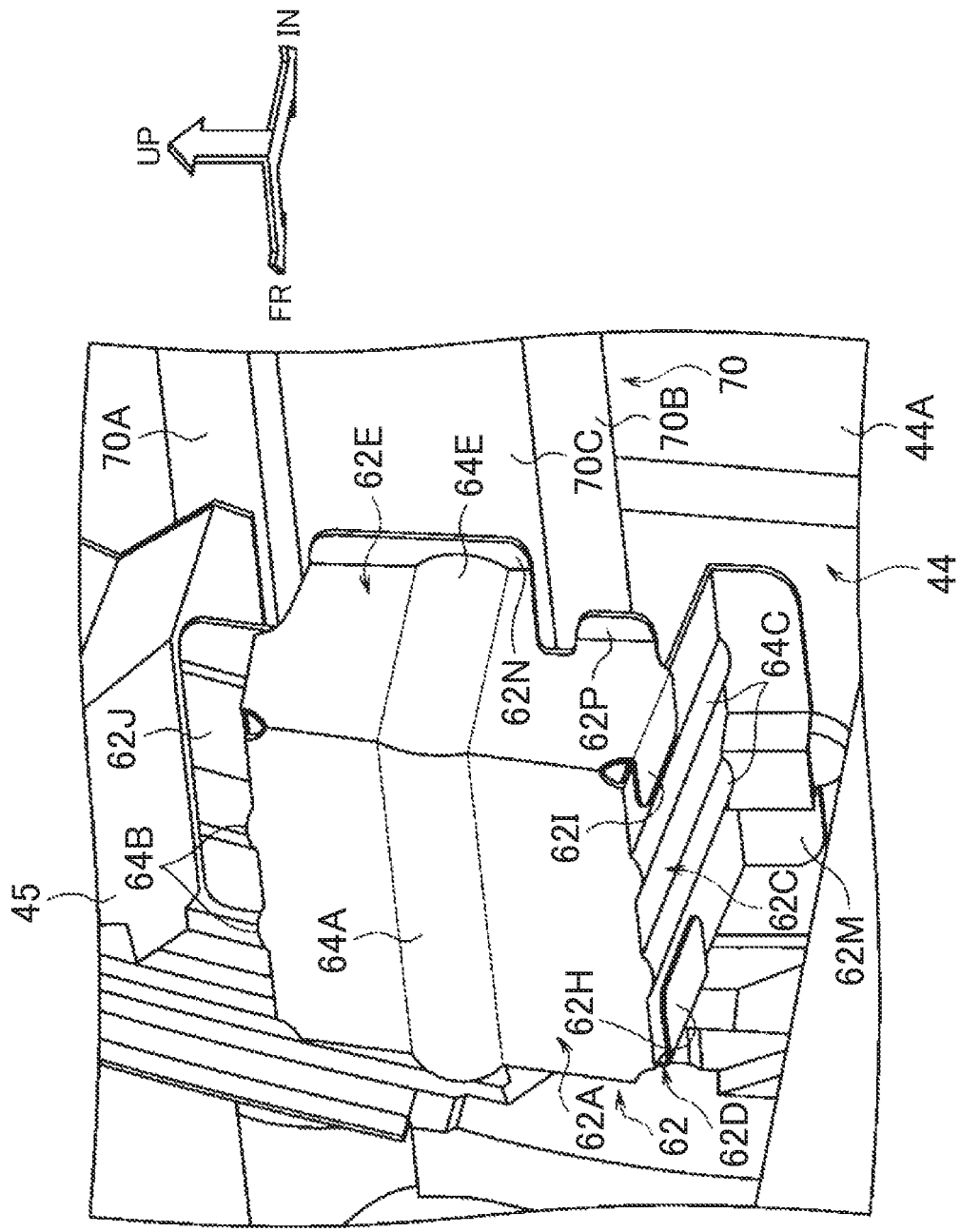
FIG. 5A is an enlarged perspective view of a load transmitting member, a portion of which is shown in FIG. 4, in an attached state, viewed at an angle from the lower rear in the vehicle front-rear direction.

FIG. 5A is an enlarged perspective view of the load transmitting member 62 in an attached state, viewed at an angle from the lower rear in the vehicle front-rear direction, and FIG. 5B is an enlarged perspective view of the load transmitting member 62 in an attached state, viewed at an angle from the upper front in the vehicle front-rear direction. As shown in these drawings, the load transmitting member 62 is formed in a box-shape that is open to the vehicle width direction inside. This load transmitting member 62 is manufactured by first cutting a single metal plate into a predetermined shape of a general cross shape, and then bending or welding this metal plate, for example.

As shown in these drawings, the load transmitting member 62 includes a side wall portion 62A that forms a vertical wall portion on the vehicle width direction outside of the load transmitting member 62. The side wall portion 62A is formed in a generally long shape that is slightly longer in the vehicle front-rear direction. A bead 64A that extends in the vehicle front-rear direction and protrudes toward the vehicle width direction outside is formed on a vertically center portion of the side wall portion 62A.

Also, the load transmitting member 62 includes an upper wall portion 62B that extends curving toward the vehicle width direction inside from an upper end portion of the side wall portion 62A, and a lower wall portion 62C that extends curving toward the vehicle width direction inside from a lower end portion of the side wall portion 62A. A plurality of beads 64B (two in this example embodiment) that extend in substantially the vehicle width direction and protrude toward the upper side in the vehicle up and down direction are formed on a middle portion of the upper wall portion 62B in the vehicle front-rear direction. Similarly, a plurality of beads 64C (two in this example embodiment) that extend in substantially the vehicle width direction and protrude toward the lower side in the vehicle up and down direction are formed on a middle portion of the lower wall portion 62C in the vehicle front-rear direction.

Moreover, the load transmitting member 62 includes a front wall portion 62D that extends curving toward the vehicle width direction inside from the front end portion of the side wall portion 62A, and a rear wall portion 62E that extends curving toward the vehicle width direction inside from the rear end portion of the side wall portion 62A. The extending lengths of an upper portion and vertically middle portion of the front wall portion 62D from the front end portion of the side wall portion 62A are set longer than the extending length of the lower portion of the front wall portion 62D, and the extending lengths of an upper portion and vertically middle portion of the rear wall portion 62E from the rear end portion of the side wall portion 62A are set longer than the extending length of the lower portion of the rear wall portion 62E. A bead 64D that extends in generally the vehicle width direction and protrudes toward the vehicle front side is formed on a vertically center portion of the front wall portion 62D, and a bead 64E that extends in generally the vehicle width direction and protrudes toward the vehicle rear side is formed on a vertically center portion of the rear wall portion 62E. The bead 64D of the front wall portion 62D and the bead 64E of the rear wall portion 62E are both formed continuous with the bead 64A of the side wall portion 62A.

Also, as shown in FIG. 5B, on the upper wall portion 62B side of the load transmitting member 62, an extended portion 62F that extends curving toward the vehicle rear side from an upper end of the front wall portion 62D is joined to the upper wall portion 62B by welding, and an extended portion 62G that extends curving toward the vehicle front side from an upper end of the rear wall portion 62E is joined to the upper wall portion 62B by welding. Similarly, as shown in FIG. 5A, on the lower wall portion 62C side of the load transmitting member 62, an extended portion 62H that extends curving toward the vehicle rear side from a lower end of the front wall portion 62D is joined to the lower wall portion 62C by welding, and an extended portion 62I that extends curving toward the vehicle front side from a lower end of the rear wall portion 62E is joined to the lower wall portion 62C by welding.

Furthermore, as shown in FIG. 5B, an upper flange portion 62J that extends curving toward the upper side in the vehicle up and down direction from the end portion of the upper wall portion 62B on the vehicle width direction inside is formed on the load transmitting member 62. This upper flange portion 62J is joined by welding to the door inner panel 44, with another member sandwiched between the upper flange portion 62J and the door inner panel 44. Also, as shown in FIG. SA, a lower flange portion 62M that is extends curving toward the lower side in the vehicle up and down direction from the end portion of the lower wall portion 62C on the vehicle width direction inside is formed on the load transmitting member 62. This lower flange portion 62M is joined to the door inner panel 44 by welding. As a result, the load transmitting member 62 forms a closed sectional portion 66 with the front end portion of the cabin inside vertical wall portion 44A of the door inner panel 44 in the vehicle front-rear direction, as shown in FIG. 3. A lower end portion of a frame bracket 45 and an upper flange portion 70A of an inside reinforcing member 70 that will be described later, are sandwiched between the upper flange portion 62J of the load transmitting member 62 and the upper end portion of the cabin inside vertical wall portion 44A.

Also, as shown in FIG. 5B, a first front flange portion 62K that curves toward the vehicle front side is formed extending from a portion, excluding a lower portion, of an end portion of the front wall portion 62D on the vehicle width direction inside, and a second front flange portion 62L that curves toward the vehicle front side is formed extending from a lower portion of the end portion of the front wall portion 62D on the vehicle width direction inside. Similarly, as shown in FIG. 5A, a first rear flange portion 62N that curves toward the vehicle rear side is formed extending from a portion, excluding a lower portion, of an end portion of the rear wall portion 62E on the vehicle width direction inside, and a second rear flange portion 62P that curves toward the vehicle rear side is formed extending from a lower portion of the end portion of the rear wall portion 62E on the vehicle width direction inside. The joining of the first front flange portion 62K, the second front flange portion 62L, the first rear flange portion 62N, and the second rear flange portion 62P of the load transmitting member 62 shown in FIGS. 5A and 5B will be described later.

As shown in FIG. 3, the upper flange portion 60A of the beltline RF 60 is joined by welding to a portion of the side wall portion 62A of the load transmitting member 62 that is above the bead 64A, and the lower flange portion 60B of the beltline RF 60 is joined by welding to a portion of the side wall portion 62A of the load transmitting member 62 that is below the bead 64A.

A reinforcing member 68 is sandwiched between the side wall portion 62A of the load transmitting member 62 and the beltline RF 60. As shown in FIG. 2, the reinforcing member 68 is formed by a long plate, and is arranged with the vehicle front-rear direction as the length direction along the beltline BL (see FIG. 1). The position of the rear end of the reinforcing member 68 is set to be slightly farther forward in the vehicle front-rear direction than the position of the rear end of the beltline RF 60. The reinforcing member 68 has a sectional shape orthogonal to the length direction that is a hat-shape, as shown in FIG. 3, along the entire length in the length direction, with the opening pointing towards the vehicle width direction inside. That is, the reinforcing member 68 includes a generally U-shaped protruding portion 68C that is open to the vehicle width direction inside, and a pair of upper and lower flange portions, i.e., an upper flange portion 68A and a lower flange portion 68B, that extend in directions away from each other from upper and lower end portions of the protruding portion 68C on the vehicle width direction inside.

The upper flange portion 68A of the reinforcing member 68 is sandwiched between an upper portion (i.e., a portion above the bead 64A) of the side wall portion 62A of the load transmitting member 62 and the upper flange portion 60A of the beltline RF 60, and is joined by welding to the side wall portion 62A of the load transmitting member 62 and the upper flange portion 60A of the beltline RF 60. Similarly, the lower flange portion 68B of the reinforcing member 68 is sandwiched between a lower portion (i.e., a portion below the bead 64A) of the side wall portion 62A of the load transmitting member 62 and the lower flange portion 60B of the beltline RF 60, and is joined by welding to the side wall portion 62A of the load transmitting member 62 and the lower flange portion 60B of the beltline RF 60. The amount that the protruding portion 68C of the reinforcing member 68 protrudes toward the vehicle width direction outside is set smaller than that of the protruding portion 60C of the beltline RF 60, and the protruding portion 68C of the reinforcing member 68 is arranged so as to cover the bead 64A of the side wall portion 62A of the load transmitting member 62.

Further, the inside reinforcing member 70 is provided adjacent to the cabin inside vertical wall portion 44A of the door inner panel 44, to the vehicle width direction inside of the beltline RF 60 inside the door main body portion 22H. The inside reinforcing member 70 is arranged overlapping with the front pillar 16 and the center pillar 18 shown in FIG. 2 in a vehicle front view, with the vehicle front-rear direction as the length direction along the beltline BL (see FIG. 1). The inside reinforcing member 70 has a sectional shape orthogonal to the length direction that is a hat-shape, as shown in FIG. 3, along the entire length in the length direction, with the opening pointing towards the vehicle width direction outside. That is, the inside reinforcing member 70 includes a generally U-shaped protruding portion 70C that is open to the vehicle width direction outside, and a pair of upper and lower flange portions, i.e., an upper flange portion 70A and a lower flange portion 70B, that extend in directions away from each other from upper and lower end portions of the protruding portion 70C on the vehicle width direction outside.

The upper flange portion 70A of the inside reinforcing member 70 is sandwiched, together with the lower end portion of the frame bracket 45, between the upper end portion of the cabin inside vertical wall portion 44A of the door inner panel 44, and the upper flange portion 62J of the load transmitting member 62, and is joined, together with the lower end portion of the frame bracket 45, to the upper end portion of the cabin inside vertical wall portion 44A and the upper flange portion 62J of the load transmitting member 62 by welding. Also, as shown in FIG. 2, the first front flange portion 62K and the first rear flange portion 62N of the load transmitting member 62 are joined by welding to a top wall portion 70C1 of the protruding portion 70C of the inside reinforcing member 70. Also, as shown in FIGS. 5A and 5B, the second front flange portion 62L of the load transmitting member 62 shown in FIG. 5B is joined by welding to the lower flange portion 70B of the inside reinforcing member 70, and the second rear flange portion 62P of the load transmitting member 62 shown in FIG. 5A is also joined by welding to the lower flange portion 70B of the inside reinforcing member 70.

(Operation and Effects)

Next, the operation and effects of the foregoing example embodiment will be described.

When a side collision occurs, the door outer panel 46 shown in FIG. 2 deforms toward the vehicle width direction inside by a collision load at that time. Also, because the beltline RF 60 is arranged inside the door main body portion 22H with the vehicle front-rear direction as the length direction along the beltline BL (see FIG. 1), the beltline RF 60 is pushed toward the vehicle width direction inside via the door outer panel 46.

Here, in this example embodiment, the first overlapping portion 44R is formed on the rear end portion of the door inner panel 44 in the vehicle front-rear direction. This first overlapping portion 44R forms a portion of the step portion 44S that is farther toward the vehicle width direction outside than the cabin inside vertical wall portion 44A that forms the door inside surface, and is arranged in a position overlapping with the outside vertical wall portion 18A of the center pillar 18 in a vehicle side view. Also, a portion of the outside vertical wall portion 18A of the center pillar 18 is the second overlapping portion 18R that faces the first overlapping portion 44R at a distance narrower than the distance between the step portion 44S and the cabin inside vertical wall portion 44A. The third overlapping portions 60X and 60Y set on the end portion of the beltline RF 60 in the length direction are connected to the first overlapping portion 44R in a position overlapping with the second overlapping portion 18R in a vehicle side view. Therefore, a collision load F when a side collision occurs is transmitted from the door outer panel 46 to the first overlapping portion 44R of the door inner panel 44 via the third overlapping portions 60X and 60Y of the beltline RF 60, and then transmitted from the first overlapping portion 44R of the door inner panel 44 to the second overlapping portion 18R of the center pillar 18.

Also, when a side collision occurs, the displacement amount in the vehicle width direction of the third overlapping portions 60X and 60Y of the beltline RF 60 until the third overlapping portions 60X and 60Y are supported by (catch on) the second overlapping portion 18R of the center pillar 18 via the first overlapping portion 44R of the door inner panel 44 is equivalent to the distance set between the first overlapping portion 44R of the door inner panel 44 and the second overlapping portion 18R of the center pillar 18, and is thus kept to a minimum. Therefore, the third overlapping portions 60X and 60Y are supported by the second overlapping portion 18R of the center pillar 18 via the first overlapping portion 44R of the door inner panel 44 before the beltline RF 60 bends much to the vehicle width direction inside by the collision load F. Furthermore, because the third overlapping portions 60X and 60Y of the beltline RF 60 are connected to the first overlapping portion 44R of the door inner panel 44, even if the beltline RF 60 tries to bend toward the vehicle width direction inside from the collision load F, relative displacement of the third overlapping portions 60X and 60Y with respect to the first overlapping portion 44R is suppressed.

As described above, when a side collision occurs, the third overlapping portions 60X and 60Y of the beltline RF 60 are supported by the second overlapping portion 18R of the center pillar 18 via the first overlapping portion 44R of the door inner panel 44 before the beltline RF 60 bends much, and even if the beltline RF 60 does try to bend, relative displacement of the third overlapping portions 60X and 60Y with respect to the first overlapping portion 44R is suppressed, so displacement of the beltline RF 60 toward the vehicle width direction inside is able to be effectively suppressed.

Moreover, the beltline RF 60 has a sectional shape orthogonal to the length direction that is a hat-shape along the entire length in the length direction, so localized deformation of the beltline RF 60 when a side collision occurs is able to be suppressed. Therefore, when a side collision occurs, the collision load F is effectively transmitted from the third overlapping portions 60X and 60Y of the beltline RF 60 to the second overlapping portion 18R of the center pillar 18 via the first overlapping portion 44R of the door inner panel 44, and the beltline RF 60 is stably supported by the center pillar 18.

Also, in this example embodiment, some of the collision load F at the time of a side collision is transmitted from the door outer panel 46 to the load transmitting member 62 via the front end portion of the beltline RF 60 in the vehicle front-rear direction, on the front end portion side of the front side door 22 in the vehicle front-rear direction, and then transmitted from the load transmitting member 62 to the end portion of the instrument panel RF 34 on the vehicle width direction outside via the front end portion of the door inner panel 44 in the vehicle front-rear direction. The load transmitted to the instrument panel RF 34 is then transmitted to the vehicle side portion side that is on the side opposite the collision side, and transmitted to the front pillar 16 via the connecting portion 36. Therefore, the collision load that acts on the front end portion of the beltline RF 60 in the vehicle front-rear direction is able to be supported by not only the vehicle side portion 10 on the collision side, but also by the instrument panel RF 34 and a vehicle body component that includes a front pillar, not shown, on the side opposite the collision side.

In this way, when a side collision occurs, both end portions of the beltline RF 60 in the length direction are supported. Also, a load transmission path for both end portions of the beltline RF 60 in the length direction is ensured, so even if the beltline RF 60 receives an impact when a side collision occurs, both end portions of the beltline RF 60 in the length direction are inhibited from moving toward the vehicle width direction inside. As a result, displacement and deformation of the beltline RF 60 when a side collision occurs are able to be more effectively suppressed.

As described above, with the vehicle side structure according to this example embodiment, deformation of a beltline portion 56 (see FIG. 1; a door panel upper end portion that includes the beltline BL) of the front side door 22 when a side collision occurs is able to be suppressed.

Also, in this example embodiment, the inside reinforcing member 70 that overlaps with the front pillar 16 and the center pillar 18 in a vehicle front view, and is arranged with the vehicle front-rear direction as the length direction along the beltline BL (see FIG. 1), is provided on the vehicle width direction inside of the beltline RF 60 inside the door main body portion 22H. Therefore, the collision load when a side collision occurs is transmitted from the front pillar 16 to the center pillar 18 via the inside reinforcing member 70.

Modified Examples of the First Example Embodiment

In the first example embodiment described above, the first overlapping portion 44R is formed on the door inner panel 44, and the third overlapping portions 60X and 60Y that are connected to the first overlapping portion 44R at a position on the beltline RF 60 overlapping with the second overlapping portion 18R of the center pillar 18 in a vehicle side view are set on the beltline RF 60, only on the rear end portion of the front side door 22 in the vehicle front-rear direction, but a similar structure may also be provided on the front end portion of the front side door 22 in the vehicle front-rear direction. That is, on the front end portion of a front side door (22) in the vehicle front-rear direction, the position of the front end in the vehicle front-rear direction of a step portion (44T) formed on a door inner panel (44) may be set farther toward the vehicle front side than it is in the first example embodiment described above, a portion of this step portion may be a first overlapping portion arranged in a position overlapping with an outside vertical wall portion (16A) of a front pillar (16) in a vehicle side view, a portion of the outside vertical wall portion (16A) may be a second overlapping portion that faces the first overlapping portion at a distance that is narrower than the distance between the step portion and a cabin inside vertical wall portion (44A), and a front end portion (i.e., an end portion in the length direction) of a beltline RF (60) in the vehicle front-rear direction may be positioned farther toward the vehicle front side than it is in the first example embodiment described above, and a third overlapping portion that is connected to the first overlapping portion in a position overlapping with the second overlapping portion in a vehicle side view may be set on this front end portion.

Also, as a modified example of the first example embodiment, for example, a terminal portion of the hinge reinforcement 52 on the vehicle width direction inside may be a facing portion that faces the step portion 44T of the door inner panel 44, and an end surface (a front end surface) of the beltline RF 60 that faces the vehicle front side may be connected to the front-rear facing wall portion 44Y of the door inner panel 44 via a bracket. The bracket in this case may include a first wall portion that forms a portion of the bracket on the vehicle width direction inside and is connected to the front-rear facing wall portion 44Y, and a second wall portion that forms a portion of the bracket on the vehicle width direction outside and is connected to an end surface of the beltline RF 60 that faces the vehicle front side.

Also, as a modified example of the first example embodiment, the rear end portion of the reinforcing member 68 in the vehicle front-rear direction may extend toward the vehicle rear side, and this kind of reinforcing member may reinforce the beltline RF 60 along the entire length. Also, as another modified example, a reinforcing member that reinforces a portion of the rear end portion of the beltline RF 60 in the vehicle front-rear direction that faces the first overlapping portion 44R of the door inner panel 44 may be set in series with the reinforcing member 68 in the vehicle front-rear direction.

Further, as another modified example of the first example embodiment, instead of the load transmitting member 62, another load transmitting member such as a load transmitting member formed by joining a reinforcing member to a box-shaped member that does not have a bead, for example, may be arranged. Further, as another modified example, a reinforcing member may be joined to an inside surface of the load transmitting member 62 of the first example embodiment.

Second Example Embodiment

Figure 7:
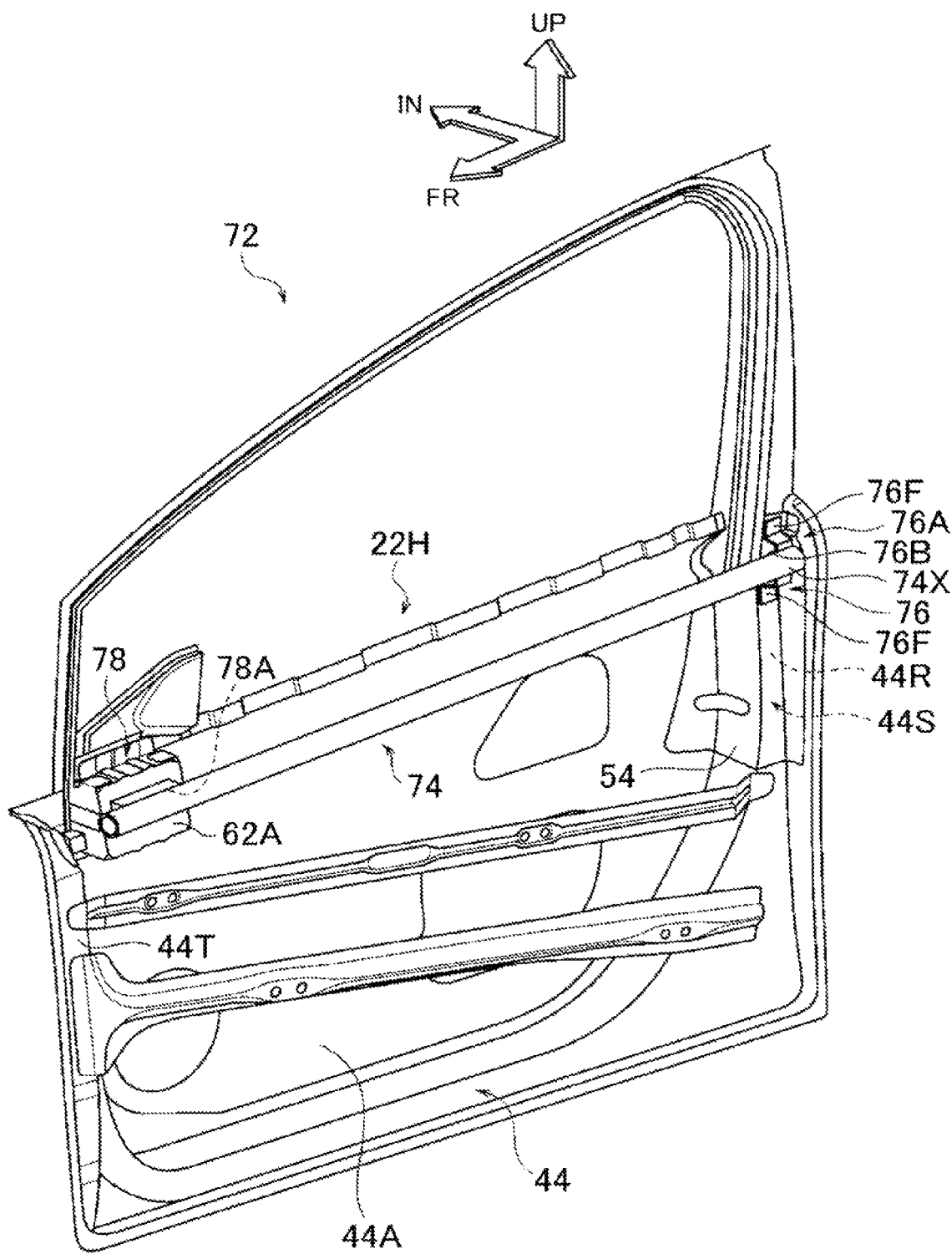
FIG. 7 is a perspective view, from the vehicle width direction outside, of a portion of an inner portion of a front side door to which a vehicle side structure according to a second example embodiment of the invention has been applied.

Next, a vehicle side structure according to a second example embodiment of the invention will be described incorporating the drawings of the first example embodiment as appropriate, while referring to FIG. 7. FIG. 7 is a perspective view, from the vehicle width direction outside, of a portion of an inner portion of a front side door 72 as a side door to which the vehicle side structure according to this example embodiment has been applied. As shown in the drawing, this example embodiment differs from the first example embodiment in that a beltline reinforcement 74 (hereinafter, abbreviated to "beltline RF 74") is provided instead of the beltline RF 60 (see FIG. 4), and the reinforcing member 68 and the inside reinforcing member 70 shown in FIG. 2 are not provided. The other structure is essentially the same as that of the first example embodiment shown in FIGS. 1 to 6. Therefore, components that are essentially the same as those in the first example embodiment will be denoted by like reference characters and descriptions of these components will be omitted.

The beltline RF 74 is arranged with the vehicle front-rear direction as the length direction along the beltline BL (see FIG. 1) inside the door main body portion 22H. The beltline RF 74 is an extremely strong and highly rigid member formed by a pipe-shaped member, and has a sectional shape orthogonal to the length direction that is a circular closed sectional shape along the entire length in the length direction. A third overlapping portion 74X that is connected to the first overlapping portion 44R shown in FIG. 7 in a position overlapping in a vehicle side view with the second overlapping portion 18R of the center pillar 18 shown in FIG. 2, is set on a rear end portion (an end portion in the length direction) of the beltline RF 74 in the vehicle front-rear direction.

The third overlapping portion 74X of the beltline RF 74 is connected to the first overlapping portion 44R via an extension 76 and the lock RF 54. The extension 76 includes a pair of upper and lower flange portions 76F that are connected by welding to the first overlapping portion 44R together with the lock RF 54, and a middle portion 76A that protrudes toward the vehicle width direction outside between the pair of upper and lower flange portions 76F. A recessed portion 76B that the third overlapping portion 74X fits into is formed on a vertically center portion of the middle portion 76A. The third overlapping portion 74X and the recessed portion 76B of the extension 76 are connected together by welding. Also, a bottom wall portion of the recessed portion 76B of the extension 76 is connected by welding to the first overlapping portion 44R via the lock RF 54.

Meanwhile, a load transmitting member 78 is interposed between the beltline RF 74 and the door inner panel 44, on a front end portion of the front side door 72 in the vehicle front-rear direction. The load transmitting member 78 has a structure similar to that of the load transmitting member 62 (see FIG. 4) in the first example embodiment except for that a seat portion 78A on which a front end portion of the beltline RF 74 sits and is connected to by welding is provided. The seat portion 78A of the load transmitting member 78 is formed on the side wall portion 62A. The load transmitting member 78 is arranged in a position overlapping with the end portion of the instrument panel RF 34 (see FIGS. 2 and 3) on the vehicle width direction outside in a vehicle side view, similar to the first example embodiment.

This structure also enables deformation of the beltline portion 56 (see FIG. 1) of the front side door 22 to be inhibited due to generally the same operation as that of the first example embodiment when a side collision occurs.

Third Example Embodiment

Next, a vehicle side structure according to a third example embodiment of the invention will be described with reference to FIGS. 8 to 12. Components that are essentially similar to those in the first and second example embodiments will be denoted by like reference characters and descriptions of these components will be omitted.

Figure 8:
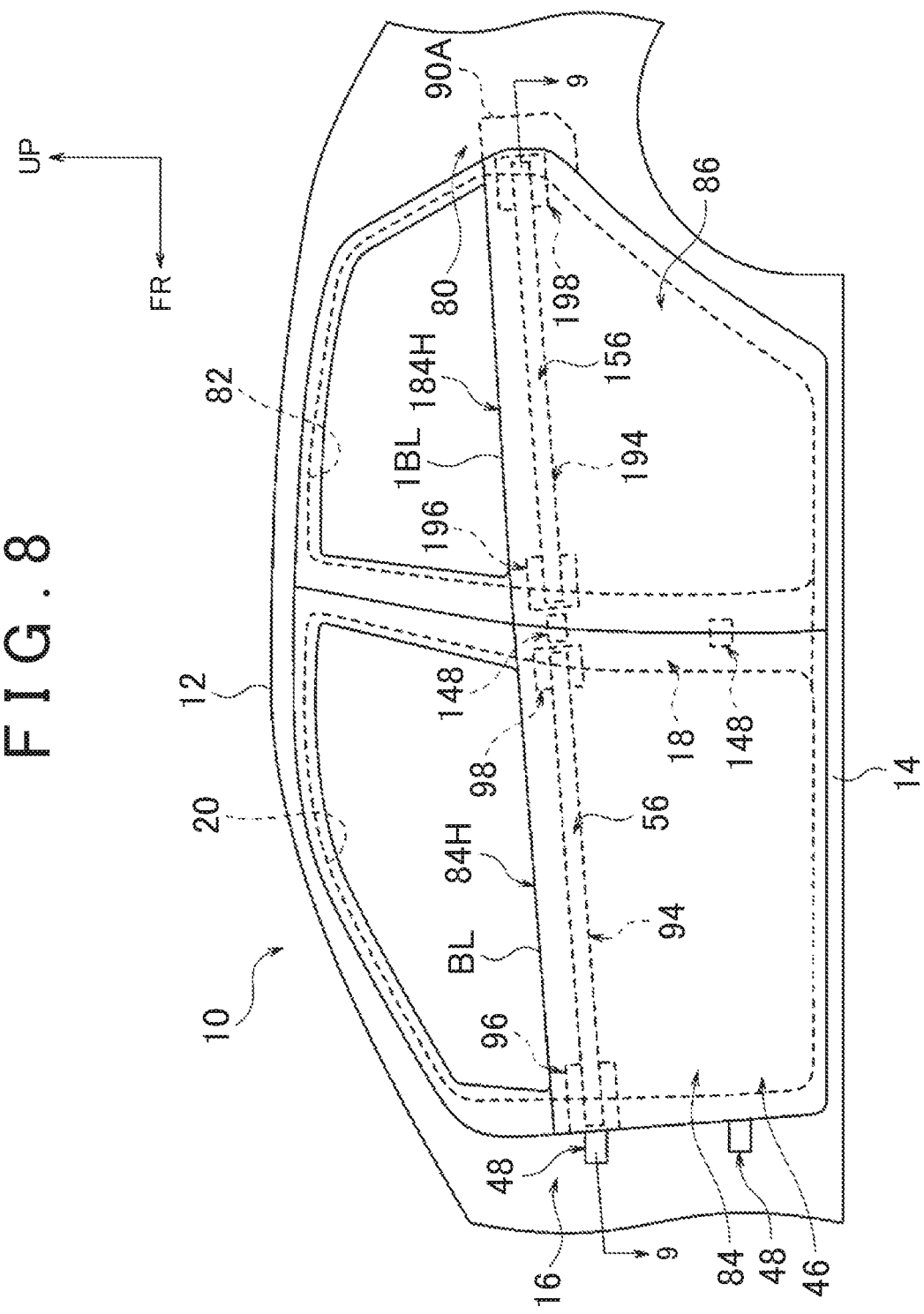
FIG. 8 is a side view of a portion of a vehicle to which a vehicle side structure according to a third example embodiment of the invention has been applied.

FIG. 8 is a side view of a portion of a vehicle to which the vehicle side structure according to this example embodiment has been applied. As shown in this drawing, a quarter pillar (also referred to as a rear pillar) 80 as a pillar is provided extending upward in the vehicle up and down direction to the vehicle rear side of the center pillar 18. An upper end portion of this quarter pillar 80 is connected to the rear end portion of the roof side rail 12. The quarter pillar 80 has a closed sectional structure that extends in substantially the vehicle up and down direction and forms a vehicle body frame member. Also, a rear door opening 82 as a door opening that is surrounded by a vehicle body frame member that includes the roof side rail 12, the center pillar 18, the rocker 14, and the quarter pillar 80, is formed on a rear portion side of the vehicle side portion 10.

In other words, the roof side rail 12 is arranged in the vehicle front-rear direction on an upper edge side of the rear door opening 82, and the rocker 14 is arranged in the vehicle front-rear direction on a lower edge side of the rear door opening 82. Also, the center pillar 18 is arranged in the vehicle up and down direction on a front edge side of the rear door opening 82, and the quarter pillar 80 is arranged in the vehicle up and down direction on a rear edge side of the rear door opening 82. The rear door opening 82 communicates the outside of the vehicle cabin with the inside of the vehicle cabin, and is opened and closed by a rear side door 86 as a side door.

FIG. 9A is an enlarged top sectional view of the vehicle side structure taken along line 9-9 in FIG. 8, and FIG. 9B is a partial enlarged view of portions a, b, c, and d of FIG. 9A. In FIGS. 9A and 9B, the cross-sections of the members are indicated by thin bold lines, and portions where members contact one another are shown slightly separated (this is also the same for FIGS. 11 and 12), similar to FIG. 2 of the first example embodiment. As shown in portion d of FIG. 9B, the quarter pillar 80 includes a quarter pillar inner panel 88 that is arranged on the vehicle cabin inside, and a quarter pillar outer portion 28C that a portion of the side outer panel 28 and is arranged to the vehicle cabin outside of the quarter pillar inner panel 88.

A front end portion of the quarter pillar inner panel 88 in the vehicle front-rear direction is joined to a front end portion of the quarter pillar outer portion 28C in the vehicle front-rear direction. A front portion of the quarter pillar outer portion 28C in the vehicle front-rear direction extends in a stepped manner on the vehicle width direction inside toward the vehicle front side in a top sectional view. Also, the quarter pillar 80 includes outside vertical wall portions 80A and 80B that extend in the vehicle up and down direction and the vehicle front-rear direction on a portion on the vehicle width direction outside formed by a portion of the quarter pillar outer portion 28C. A reinforcing bracket 90A that is joined to a front portion (a portion having a stepped shape in a top sectional view) of the quarter pillar outer portion 28C in the vehicle front-rear direction, is arranged inside of the cross-section of the quarter pillar 80.

Next, the structure of the front portion side of the vehicle side portion 10 will be described. The front door opening 20 shown in FIG. 8 is opened and closed by a front side door 84 as a side door. As shown in FIG. 9A, the front side door 84 includes a door inner panel 92 arranged on the vehicle cabin inside, and a door outer panel 46 (the same door outer panel as in the first example embodiment) that is arranged to the vehicle cabin outside of the door inner panel 92. The door outer panel 46 forms a door main body portion 84H with the door inner panel 92.

The door inner panel 92 has a structure similar to that of the door inner panel 44 (see FIG. 2) in the first example embodiment, except for the structure on the front end portion side in the vehicle front-rear direction. Therefore, components of the door inner panel 92 that are the same as those of the door inner panel 44 (see FIG. 2) in the first example embodiment will be denoted by like reference characters.

A front end portion of the door inner panel 92 in the vehicle front-rear direction includes a front side vertical wall portion 92A that is curved toward the vehicle width direction outside from the front end portion of the cabin inside vertical wall portion 44A, and is arranged between the front end portion of the cabin inside vertical wall portion 44A and near the front end portion of the door outer panel 46, as shown in portion a of FIG. 9B. The front side vertical wall portion 92A is formed in a general crank-shape in a top sectional view, and has a front-rear facing wall portion 92X that faces the front pillar 16 in the vehicle front-rear direction, and a step portion 92S that is farther toward the vehicle width direction outside than the cabin inside vertical wall portion 44A. A portion of the step portion 92S is a first overlapping portion 92R that is arranged in a position overlapping with the outside vertical wall portion 16A of the front pillar 16 in a vehicle side view. Also, a portion of the outside vertical wall portion 16A of the front pillar 16 is a second overlapping portion 16R that faces the first overlapping portion 92R at a distance that is narrower than the distance between the step portion 92S and the cabin inside vertical wall portion 44A.

Also, a door side mounting portion 48B of a door hinge 48 is attached to a front wall portion 92F of the front side vertical wall portion 92A of the door inner panel 92 that extends curving toward the vehicle width direction outside from the front end portion of the step portion 92S. A pillar side mounting portion 48A of the door hinge 48 is attached to the outside vertical wall portion 16A of the front pillar 16. Furthermore, a front side flange portion 92B that curves toward the vehicle front side from an end portion of the front wall portion 92F on the vehicle width direction outside is formed on the door inner panel 92. A terminal portion of the door outer panel 46 is fixed by hemming to a tip end portion of the front side flange portion 92B.

As shown in FIG. 9A, a beltline reinforcement 94 (hereinafter, abbreviated to "beltline RF 94") is arranged with the vehicle front-rear direction as the length direction along the beltline BL (see FIG. 8), to the vehicle width direction outside in the door main body portion 84H of the front side door 84. The beltline RF 94 provided on the front side door 84 may also be referred to as the front beltline RF 94, but in the description below will simply be referred to as the beltline RF 94 except when there is a need to distinguish it from a rear beltline reinforcement 194 (hereinafter, abbreviated to "rear beltline RF 194") as a beltline reinforcement provided on the rear side door 86.

The beltline RF 94 is an extremely strong and highly rigid member formed by a pipe-shaped member, and has a sectional shape orthogonal to the length direction that is a circular closed sectional shape along the entire length in the length direction. As shown in portion a of FIG. 9B, a third overlapping portion 94X that is connected to the first overlapping portion 92R at a position overlapping with the second overlapping portion 16R of the front pillar 16 in a vehicle side view, is set on a front end portion (an end portion in the length direction) of the beltline RF 94 in the vehicle front-rear direction. Also, as shown in portion b of FIG. 9B, a third overlapping portion 94Y that is connected to the first overlapping portion 44R at a position overlapping with the second overlapping portion 18R of the center pillar 18 in a vehicle side view, is set on a rear end portion (an end portion in the length direction) of the beltline RF 94 in the vehicle front-rear direction.

Figure 10:
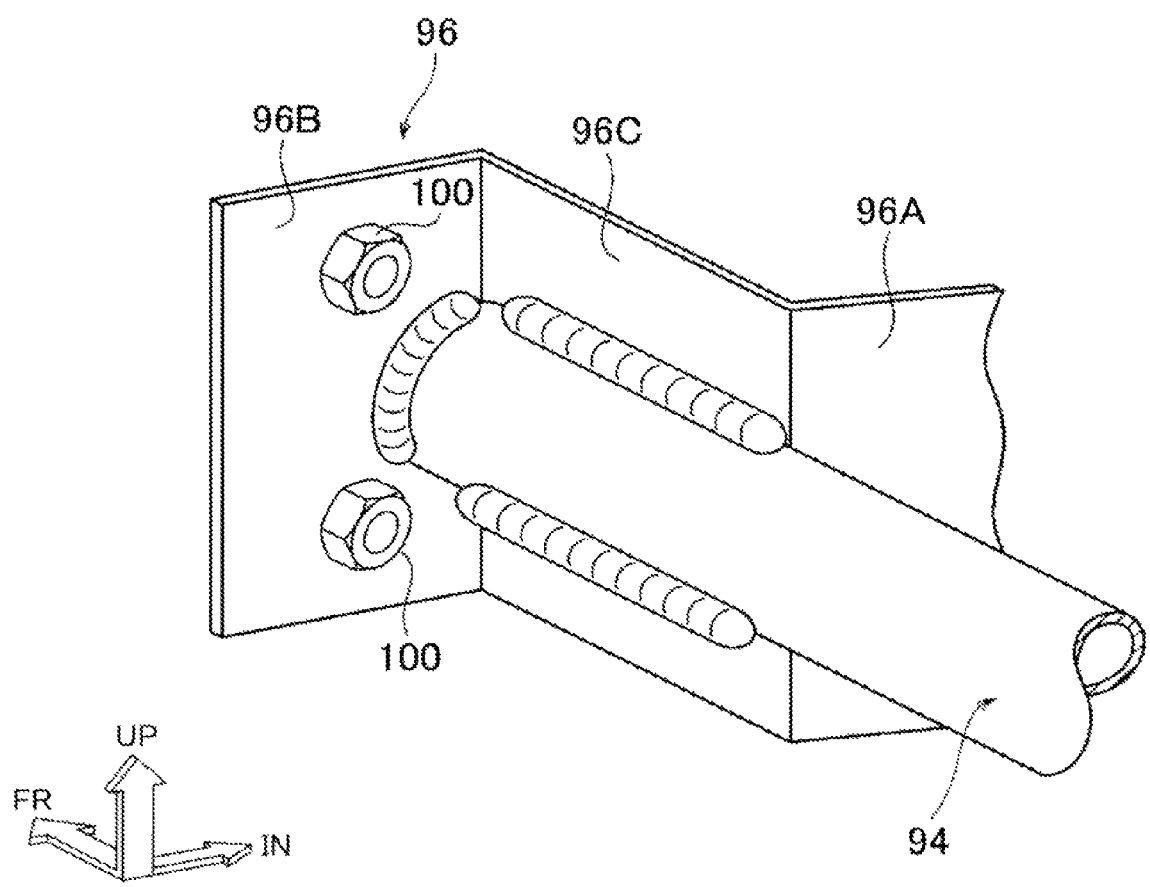
FIG. 10 is an enlarged perspective view of a portion of a bracket and a front end portion of a beltline reinforcement shown in FIG. 9A.

As shown in portion a of FIG. 9B, a front end portion (an end portion in the length direction) of the beltline RF 94 in the vehicle front-rear direction is connected to the door inner panel 92 via a bracket 96, and a rear end portion (an end portion in the length direction) of the beltline RF 94 in the vehicle front-rear direction is connected to the door inner panel 92 via a bracket 98. FIG. 10 is an enlarged perspective view of a portion of the bracket 96 and the front end portion of the beltline RF 94. As shown in FIGS. 9A and 10, the brackets 96 and 98 are plate-shaped members that are bent in a stepped shape, and are arranged such that edge lines of the bent portions face in the vehicle up and down direction.

The bracket 96 and the bracket 98 are members that are arranged on different portions, as described above, but because they are members that connect the end portion of the door inner panel 92 in the vehicle front-rear direction to the end portion of the beltline RF 94 in the length direction by essentially the same structure, the two brackets 96 and 98 will be described as one bracket (i.e., in the singular) below. In the description of the bracket 96 and 98 below, two reference characters follow each constituent element. The first of these two reference characters is a reference character for describing the bracket 96, and the second of the two reference characters is a reference character for describing the bracket 98.

As shown in portions a and b of FIG. 9B, the bracket 96 and 98 includes a first wall portion 96A and 98A that forms a portion of the portion of the bracket 96 and 98 on the vehicle width direction inside and is connected by welding to the front-rear facing wall portion 92X and 44X of the door inner panel 92. Also, the bracket 96 and 98 includes a second wall portion 96B and 98B that forms a portion of the bracket 96 and 98 on the vehicle width direction outside. The second wall portion 96B and 98B is connected by welding to an end surface 94F and 94R of the end portion of the beltline RF 94 in the vehicle front-rear direction that faces in the vehicle front-rear direction.

Moreover, the bracket 96 and 98 includes a connecting wall portion 96C and 98C that connects the first wall portion 96A and 98A and the second wall portion 96B and 98B together. The connecting wall portion 96C and 98C is connected by welding to the first overlapping portion 92R and 44R of the door inner panel 92, and connected by welding to the third overlapping portion 94X and 94Y of the beltline RF 94. Also, an inside terminal portion 96D and 98D that curves toward the opposite side than the side where the front-rear facing wall portion 92X and 44X is located, is formed extending from the end portion of the first wall portion 96A and 98A on the vehicle width direction outside. The inside terminal portion 96D and 98D are connected to the cabin inside vertical wall portion 44A by welding.

Also, as shown in FIG. 10, weld nuts 100 are fixed on both the upper and lower sides of the front end portion of the beltline RF 94, to the second wall portion 96B of the bracket 96. The weld nuts 100 are fixed to outer peripheral portions of bolt insertion holes, not shown, that are formed in the second wall portion 96B. Also, bolts, not shown, that pass through the door side mounting portion 48B of the door hinge 48 and the front wall portion 92F of the door inner panel 92 shown in portion a of FIG. 9B are screwed into these weld nuts 100 (see FIG. 10). As a result, the door side mounting portion 48B of the door hinge 48, the front wall portion 92F of the door inner panel 92, and the second wall portion 96B of the bracket 96 are all fastened together.

Next, the structure of the rear portion side of the vehicle side portion 10 shown in FIG. 9A will be described. Although the rear side door 86 arranged on the rear portion side of the vehicle side portion 10 differs from the front side door 84 in terms of the pillars that are arranged on the front side and the rear side, the basic structure of the rear side door 86 is the same as that of the front side door 84. Therefore, constituent elements of the rear side door 86 that are essentially the same as those of the front side door 84 will be denoted in the drawings as the same reference characters as those of the corresponding constituent elements of the front side door 84, preceded by a "1", and descriptions of these corresponding constituent elements will be omitted. Also, a door hinge 148 that connects the rear side door 86 to the center pillar 18 also has essentially the same structure as that of the door hinge 48 that connects the front side door 84 to the front pillar 16. Therefore, constituent elements of the door hinge 148 will be denoted in the drawings as the same reference characters as those of the corresponding constituent elements of the door hinge 48, preceded by a "1".

A front-rear facing wall portion 192X that faces the center pillar 18 in the vehicle front-rear direction, and a step portion 192S that is farther to the vehicle width direction outside than a cabin inside vertical wall portion 144A, are set on a front side vertical wall portion 192A shown in portion c of FIG. 9B of a door inner panel 192 of the rear side door 86. A portion of the step portion 192S is a first overlapping portion 192R that is arranged in a position overlapping with the outside vertical wall portion 18A of the center pillar 18 in a vehicle side view. Also, a portion of the outside vertical wall portion 18A of the center pillar 18 is a second overlapping portion 116R that faces the first overlapping portion 192R at a distance that is narrower than the distance between the step portion 192S and the cabin inside vertical wall portion 144A.

Also, in the door inner panel 192 of the rear side door 86 shown in FIG. 9A, a front-rear facing wall portion 144X that faces the quarter pillar 80 in the vehicle front-rear direction, and a step portion 144S that is farther to the vehicle width direction outside than the cabin inside vertical wall portion 144A, are set on a rear side vertical wall portion 144D shown in portion d of FIG. 9B. A portion of the step portion 144S is a first overlapping portion 144R that is arranged in a position overlapping with an outside vertical wall portion 80A of the quarter pillar 80 in a vehicle side view. Also, a portion of the outside vertical wall portion 80A of the quarter pillar 80 is a second overlapping portion 118R that faces the first overlapping portion 144R at a distance that is narrower than the distance between the step portion 144S and the cabin inside vertical wall portion 144A.

Also, as shown in FIG. 9A, a rear beltline RF 194 provided on the rear side door 86 is arranged with the same structure and attached in the same manner as the front beltline RF 94 provided on the front side door 84. The rear end portion of the front beltline RF 94 and the front end portion of the rear beltline RF 194 are arranged in positions farther toward the vehicle width direction outside than the center pillar 18, and in positions overlapping in a vehicle front view.

Further, as shown in portion d of FIG. 9B, in the quarter pillar 80, a reinforcing portion 90 that reinforces the portion overlapping with the first overlapping portion 144R in a vehicle side view is set by a reinforcing bracket 90A being joined to the quarter pillar outer portion 28C.

(Operation and Effects)

Next, the operation and effects of the example embodiment described above will be described.

Figure 11:
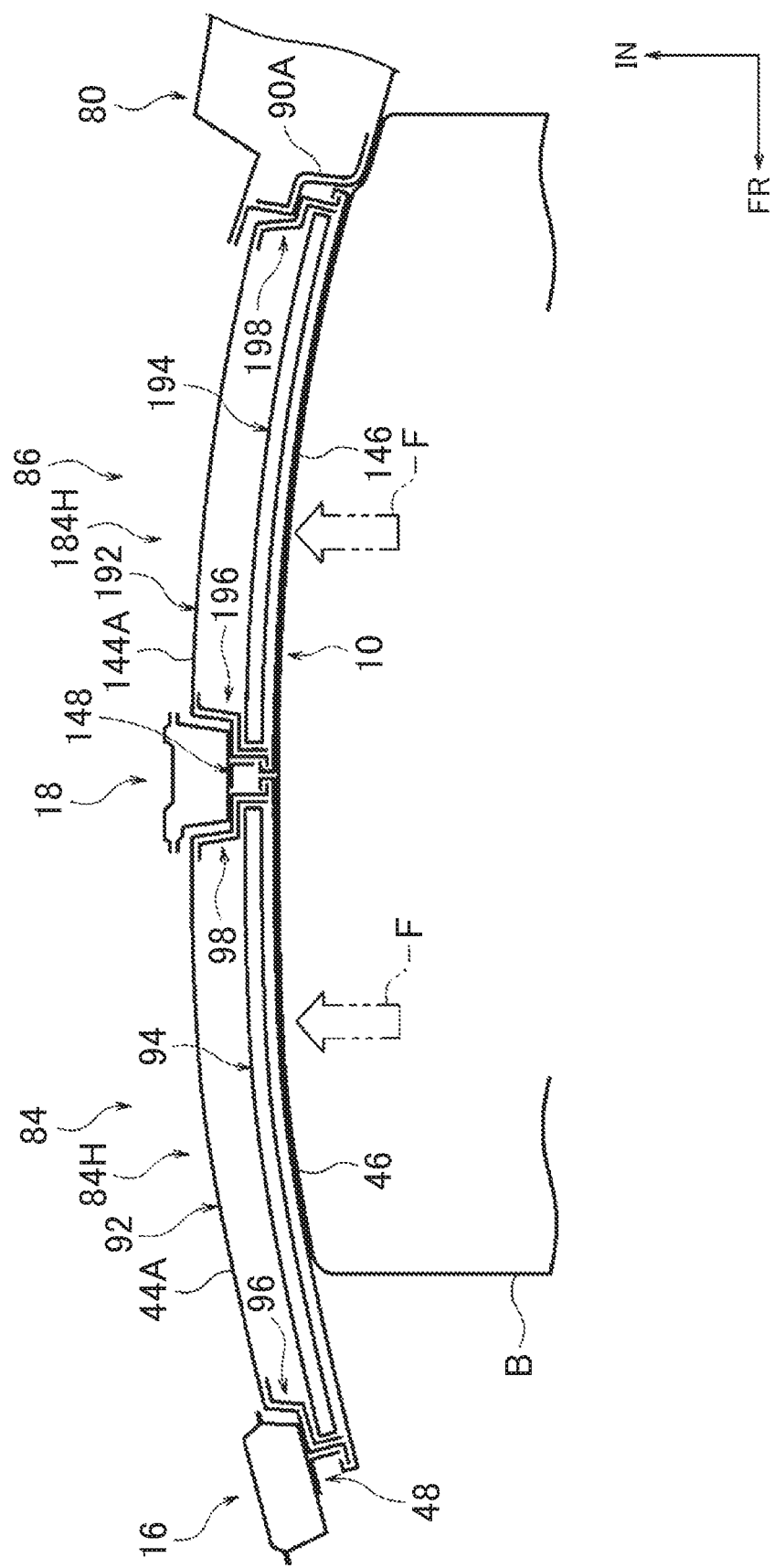
FIG. 11 is a top sectional view of the vehicle side structure shown in FIG. 9A when a side collision occurs.

FIG. 11 is a view of a state in which a barrier B has collided with the front side door 84 and the rear side door 86 in a side collision. When the barrier B collides with the front side door 84 and the rear side door 86 in a side collision, the door outer panels 46 and 146 deform toward the vehicle width direction inside from the collision load F at this time. Also, because the beltline RFs 94 and 194 are arranged with the vehicle front-rear direction as the length direction along the beltlines BL and 1BL (see FIG. 8) inside the door main body portions 84H and 184H, the beltline RFs 94 and 194 are pushed toward the vehicle width direction inside via the door outer panels 46 and 146.

The collision load F when a side collision occurs is transmitted from the door outer panels 46 and 146 shown in FIG. 9A to the first overlapping portions 92R, 44R, 192R, and 144R of the door inner panels 92 and 192 via the third overlapping portions 94X, 94Y, 194X, and 194Y of the beltline RFs 94 and 194 shown in FIG. 9B, and then transmitted from these first overlapping portions 92R, 44R, 192R, and 144R to the second overlapping portions 16R, 18R, 116R, and 118R of the pillars (i.e., the front pillar 16, the center pillar 18, and the quarter pillar 80 (hereinafter, simply referred to as the "pillars 16, 18, and 80")).

Further, when a side collision occurs, the displacement amount toward the vehicle width direction of the third overlapping portions 94X, 94Y, 194X, and 194Y of the beltline RFs 94 and 194 until the third overlapping portions 94X, 94Y, 194X, and 194Y are supported by (catch on) the second overlapping portions 16R, 18R, 116R, and 118R of the pillars 16, 18, and 80 via the first overlapping portions 92R, 44R, 192R, and 144R of the door inner panels 92 and 192 is equivalent to the distance set between the first overlapping portions 92R, 44R, 192R, and 144R of the door inner panels 92 and 192, and the second overlapping portions 16R, 18R, 116R, and 118R of the pillars 16, 18, and 80, and is thus kept to a minimum. Therefore, the third overlapping portions 94X, 94Y, 194X, and 194Y are supported by the second overlapping portions 16R, 18R, 116R, and 118R of the pillars 16, 18, and 80 via the first overlapping portions 92R, 44R, 192R, and 144R of the door inner panels 92 and 192 before the beltline RFs 94 and 194 bend much toward the vehicle width direction inside from the collision load F (see FIG. 9A).

Furthermore, because the third overlapping portions 94X, 94Y, 194X, and 194Y of the beltline RFs 94 and 194 are connected to the first overlapping portions 92R, 44R, 192R, and 144R of the door inner panels 92 and 192, relative displacement of the third overlapping portions 94X, 94Y, 194X, and 194Y with respect to the first overlapping portions 92R, 44R, 192R, and 144R is able to be inhibited, even if the beltline RFs 94 and 194 try to bend toward the vehicle width direction inside from the collision load F (see FIG. 9A).

As described above, when a side collision occurs, the third overlapping portions 94X, 94Y, 194X, and 194Y of the beltline RFs 94 and 194 are supported by the second overlapping portion 16R, 18R, 116R, and 118R of the pillars 16, 18, and 80 via the first overlapping portions 92R, 44R, 192R, and 144R of the door inner panels 92 and 192 before the beltline RFs 94 and 194 bend much, and even if the beltline RFs 94 and 194 do try to bend, relative displacement of the third overlapping portions 94X, 94Y, 194X, and 194Y with respect to the first overlapping portions 92R, 44R, 192R, and 144R is able to be suppressed, so displacement of the beltline RFs 94 and 194 toward the vehicle width direction inside is able to be effectively suppressed.

Moreover, the beltline RFs 94 and 194 has a sectional shape orthogonal to the length direction that is a closed sectional shape along the entire length in the length direction, so when a side collision occurs, localized deformation of the beltline RFs 94 and 194 is able to be suppressed. Therefore, when a side collision occurs, the collision load F (see FIG. 9A) is effectively transmitted from the third overlapping portions 94X, 94Y, 194X, and 194Y of the beltline RFs 94 and 194 to the second overlapping portions 16R, 18R, 116R, and 118R of the pillars 16, 18, and 80 via the first overlapping portions 92R, 44R, 192R, and 144R of the door inner panels 92 and 192, and the beltline RFs 94 and 194 are stably supported by the pillars 16, 18, and 80.

Also, in this example embodiment, the first overlapping portions 92R, 44R, 192R, and 144R are formed on both end portions of the door inner panels 92 and 192 in the vehicle front-rear direction, and the third overlapping portions 94X, 94Y, 194X, and 194Y are set on both end portions of the beltline RFs 94 and 194 in the length direction. Therefore, when a side collision occurs, both end portions of the beltline RF 94 in the length direction are supported by the pillars 16 and 18, and both end portions of the beltline RF 194 in the length direction are supported by the pillars 18 and 80, as shown in FIG. 11. In this way, a load transmission path is ensured for each of the end portions of the beltline RFs 94 and 194 in the length direction, so even if the beltline RFs 94 and 194 receive an impact when a side collision occurs, both end portions of the beltline RFs 94 and 194 in the length direction are inhibited from moving toward the vehicle width direction inside. As a result, displacement and deformation of the beltline RFs 94 and 194 when a side collision occurs are able to be even more effectively suppressed.

Also, in this example embodiment, as shown in portion d of FIG. 9B, the reinforcing portion 90 that reinforces a portion that overlaps with the first overlapping portion 144R in a vehicle side view is provided on the quarter pillar 80. Therefore, even if the second overlapping portion 118R of the quarter pillar 80 supports the first overlapping portion 144R of the door inner panel 192, deformation of the quarter pillar 80 when a side collision occurs is able to be suppressed. As a result, deformation of the rear portion of the rear side door 86 when the side collision shown in FIG. 11 occurs is able to be effectively inhibited.

As described above, with the vehicle side structure of this example embodiment, deformation of the beltline portions 56 and 156 (see FIG. 8) of the front side door 84 and the rear side door 86 when a side collision occurs is able to be suppressed.

Also, according to this example embodiment, the pillars 16, 18, and 80, the front-rear facing wall portions 92X, 44X, 192X, and 144X of the door inner panels 92 and 192, and the first wall portions 96A, 98A, 196A, and 198A of the brackets 96, 98, 196, and 198 are all arranged overlapping in the vehicle front-rear direction, and the first wall portions 96A, 98A, 196A, and 198A of the brackets 96, 98, 196, and 198 are connected to the front-rear facing wall portions 92X, 44X, 192X, and 144X of the door inner panels 92 and 192, as shown in FIG. 9B. Therefore, when a collision force f is input from the vehicle front side when the frontal collision shown in FIG. 12 occurs, the collision load is nicely transmitted between the pillars 16, 18, and 80, the front-rear facing wall portions 92X, 44X, 192X, and 144X of the door inner panels 92 and 192, and the first wall portions 96A, 98A, 196A, and 198A of the brackets 96, 98, 196, and 198.

Also, the second wall portions 96B, 98B, 196B, and 198B of the brackets 96, 98, 196, and 198 are connected to the end surfaces 94F, 94R, 194F, and 194R of the beltline RFs 94 and 194 shown in FIG. 9B that face in the vehicle front-rear direction. Therefore, when a frontal collision occurs, the collision load is nicely transmitted between the second wall portions 96B, 98B, 196B, and 198B of the brackets 96, 98, 196, and 198, and the end surfaces 94F, 94R, 194F, and 194R of the beltline RFs 94 and 194 that face in the vehicle front-rear direction.

Also, the door hinges 48 and 148 and the brackets 96 and 196 shown in portions a and c of FIG. 9B are fastened together with the front wall portions 92F and 192F of the door inner panels 92 and 192 sandwiched in between. Therefore, when a frontal collision occurs, the ability of the collision load to be transmitted between the pillars 16 and 18 and the beltline RFs 94 and 194 via the door hinges 48 and 148, the front wall portions 92F and 192F of the door inner panels 92 and 192, and the brackets 96 and 196, is able to be improved.

Figure 12:
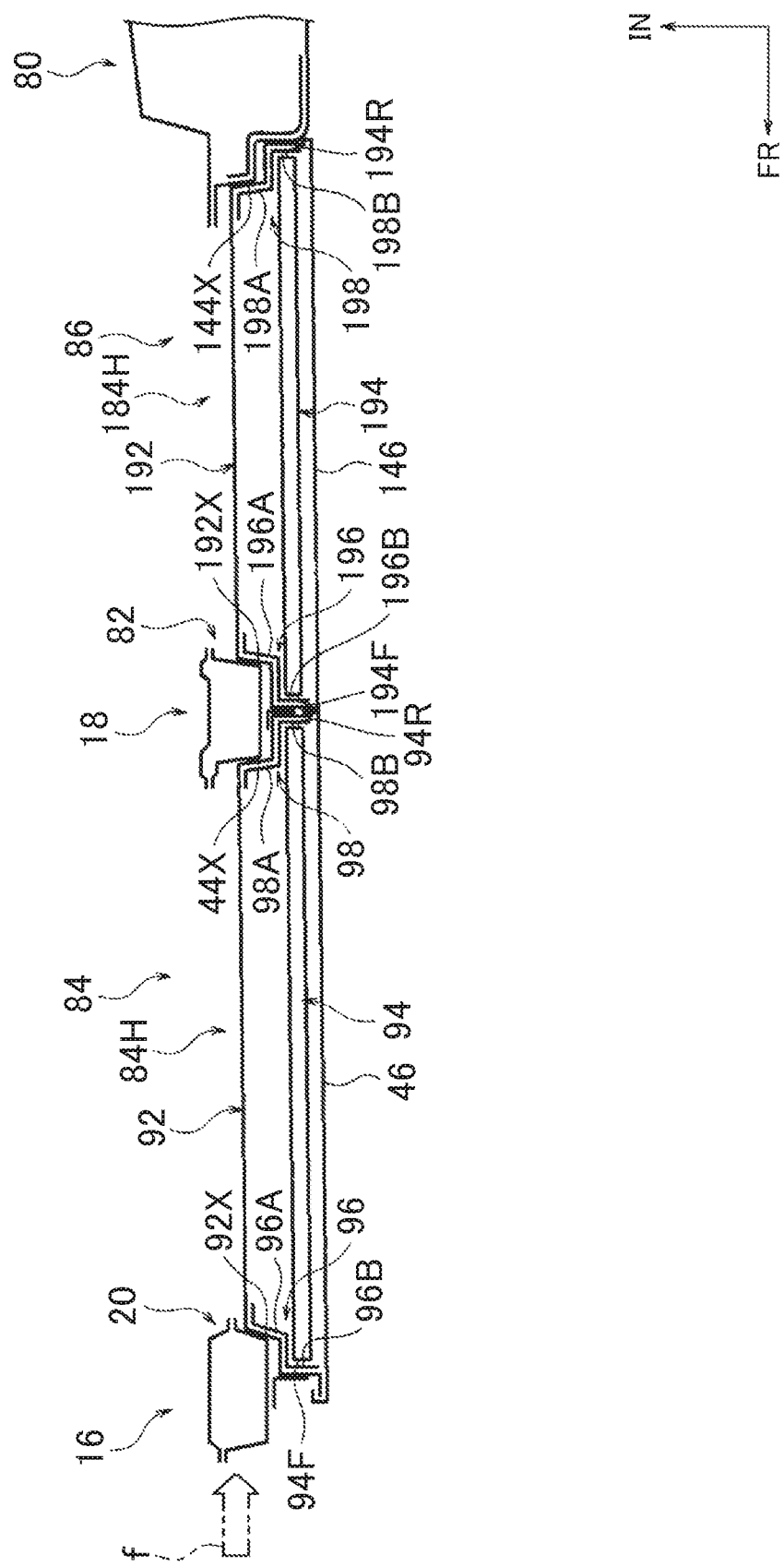
FIG. 12 is a top sectional view of the vehicle side structure shown in FIG. 9A when a frontal collision occurs.

As a result, when the frontal collision shown in FIG. 12 occurs, the collision load is nicely transmitted between the beltline RFs 94 and 194 and the pillars 16, 18, and 80 via the brackets 96, 98, 196, and 198.

Also, as shown in FIG. 9B, the connecting wall portions 96C, 98C, 196C, and 198C that connect the first wall portions 96A, 98A, 196A, and 198A to the second wall portions 96B, 98B, 196B, and 198B of the brackets 96, 98, 196, and 198, are connected to the first overlapping portions 92R, 44R, 192R, and 144R of the door inner panels 92 and 192, and to the third overlapping portions 94X, 94Y, 194X, and 194Y of the beltline RFs 94 and 194. Therefore, even if the brackets 96, 98, 196, and 198 are interposed between the door inner panels 92 and 192 and the beltline RFs 94 and 194, when a side collision occurs, the displacement amount in the vehicle width direction of the third overlapping portions 94X, 94Y, 194X, and 194Y of the beltline RFs 94 and 194 until the third overlapping portions 94X, 94Y, 194X, and 194Y are supported by the second overlapping portion 16R, 18R, 116R, and 118R of the pillars 16, 18, and 80 is able to be kept to a minimum. Therefore, the third overlapping portions 94X, 94Y, 194X, and 194Y of the beltline RFs 94 and 194 are able to be stably supported by the second overlapping portions 16R, 18R, 116R, and 118R of the pillars 16, 18, and 80 via the brackets 96, 98, 196, and 198.

Also, in this example embodiment, when the front beltline RF 94 moves backwards from the collision load f when a frontal collision occurs, the rear end portion of the front beltline RF 94 bumps into the front end portion of the rear beltline RF 194 via portions of the door main body portions 84H and 184H and the like at positions farther toward the vehicle width direction outside than the center pillar 18, as shown in FIG. 12. Therefore, when a frontal collision occurs, the load that deforms the center pillar 18 is reduced, and the collision load f is able to be transmitted toward the vehicle rear side while inhibiting deformation of the front door opening 20 and the rear door opening 82.

Fourth Example Embodiment

Figure 13:
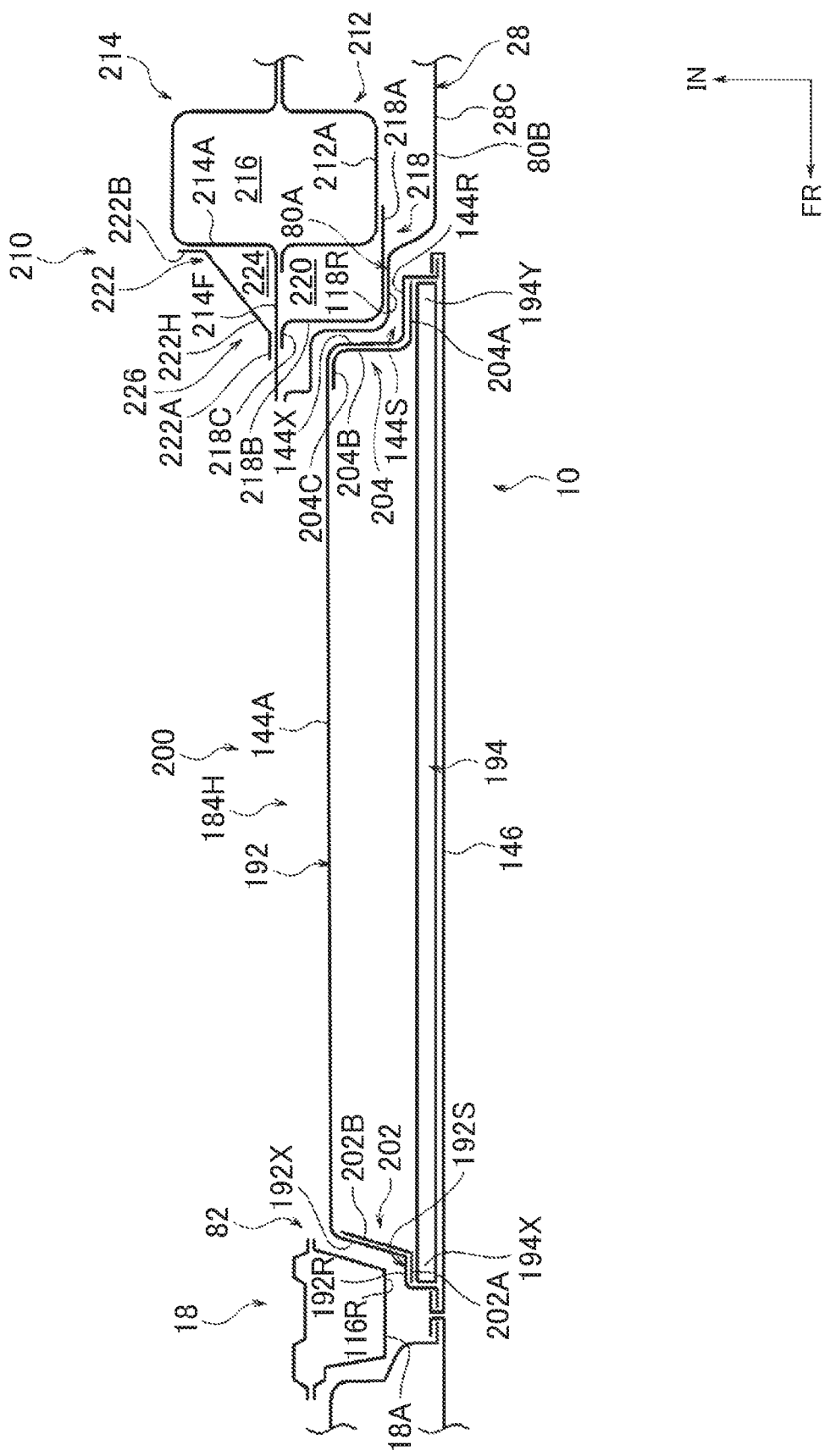
FIG. 13 is a top sectional view of a vehicle side structure according to a fourth example embodiment of the invention.
Figure 14:
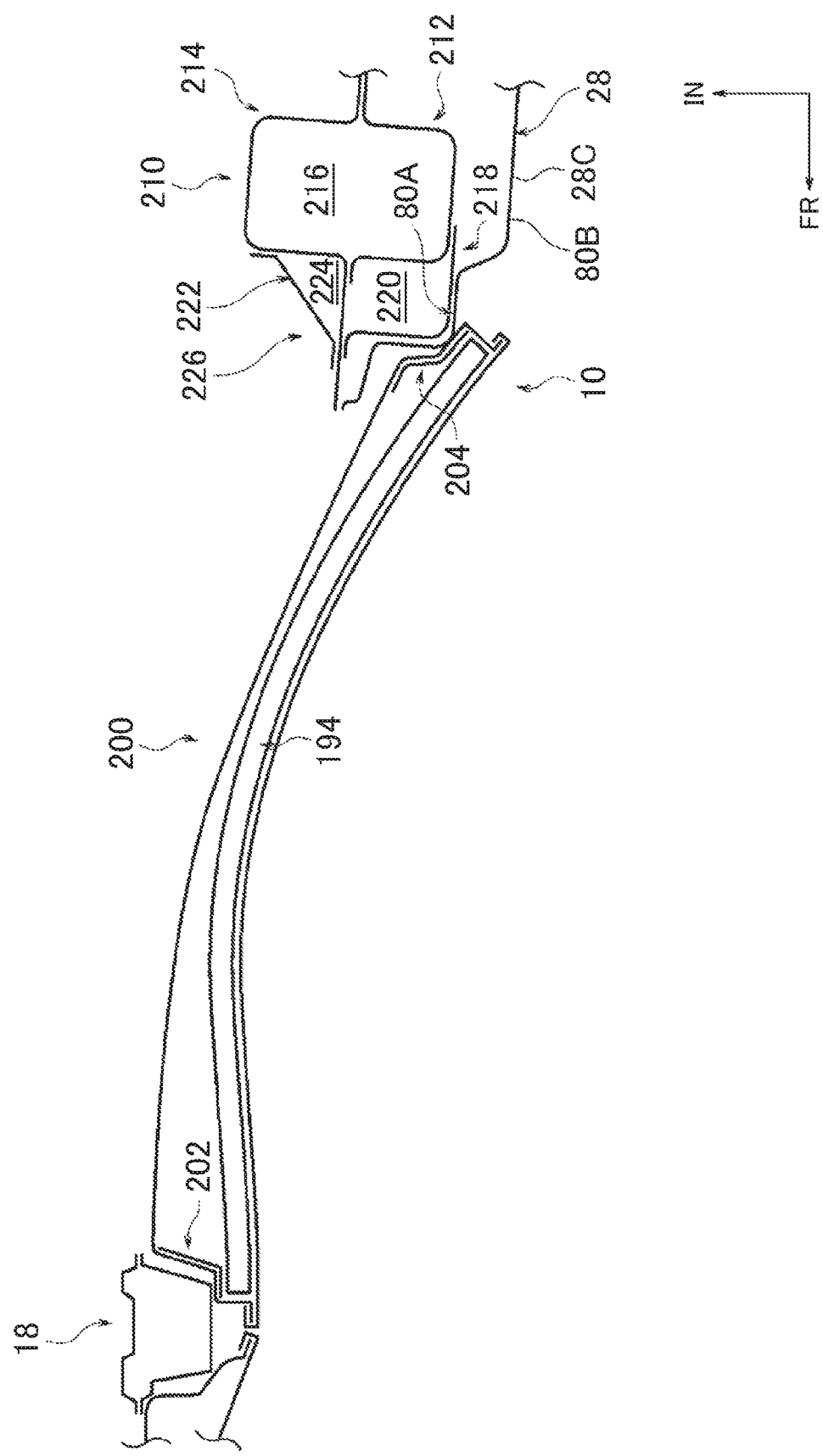
FIG. 14 is a top sectional view of the vehicle side structure shown in FIG. 13 when a side collision occurs.

Next, a vehicle side structure according to a fourth example embodiment of the invention will be described with reference to FIGS. 13 and 14. FIG. 13 is a top sectional view of a vehicle side structure according to this example embodiment cut near a beltline of a rear side door, and FIG. 14 is a top sectional view of the vehicle side structure shown in FIG. 13 when a side collision occurs. In these drawings, the cross-sections of the members are indicated by thin bold lines, and portions where members contact one another are shown slightly separated, similar to FIG. 2 of the first example embodiment.

As shown in these drawings, this example embodiment is applied to a rear portion of the vehicle side portion 10, and differs from the third example embodiment in that a hinge reinforcement 202 (hereinafter, abbreviated to "hinge RF 202") is applied instead of the bracket 196 (see FIG. 9A), and a lock reinforcement 204 (hereinafter, abbreviated to "lock RF 204") is applied instead of the bracket 198 (see FIG. 9A), and that the structure of a quarter pillar 210 differs from the structure of the quarter pillar 80 (see portion d of FIG. 9B) in the third example embodiment. The other structure is essentially the same as that in the third example embodiment. Therefore, components that are essentially the same as those of the third example embodiment will be denoted by like reference characters, and descriptions of these components will be omitted.

As shown in FIG. 13, with a rear side door 200 as a side door that opens and closes the rear door opening 82, a door main body portion 184H that is the same as that in the third example embodiment is formed by the door inner panel 192 and a door outer panel 146 that are the same as those in the third example embodiment.

On a front end portion of the rear side door 200 in the vehicle front-rear direction, the third overlapping portion 194X of the beltline RF 194 is connected to the first overlapping portion 192R of the door inner panel 192 via the hinge RF 202. An outside wall portion 202A of the hinge RF 202, to which the third overlapping portion 194X of the beltline RF 194 is connected by welding, is connected by welding to the step portion 192S of the door inner panel 192. Also, the hinge RF 202 includes a main body wall portion 202B that is continuous with the outside wall portion 202A. The main body wall portion 202B is connected by welding or the like to the front-rear facing wall portion 192X of the door inner panel 192, and reinforces a mounting portion of a door hinge (see the door hinge 148 in FIG. 9A), not shown.

On the rear end portion of the rear side door 200 in the vehicle front-rear direction, the third overlapping portion 194Y of the beltline RF 194 is connected to the first overlapping portion 144R of the door inner panel 192 via the lock RF 204. An outside wall portion 204A of the lock RF 204, to which the third overlapping portion 194Y of the beltline RF 194 is connected by welding, is connected by welding to the step portion 144S of the door inner panel 192. Also, the lock RF 204 includes a main body wall portion 204B that is continuous with the outside wall portion 204A. This main body wall portion 204B is connected by welding or the like to the front-rear facing wall portion 144X of the door inner panel 192, and reinforces a mounting portion of a lock mechanism, not shown. The lock RF 204 includes an inside wall portion 204C that extends curving toward the vehicle front side from the end portion of the main body wall portion 204B on the vehicle width direction inside. The inside wall portion 204C is connected by welding to the rear end portion of the cabin inside vertical wall portion 144A of the door inner panel 192.

Also, the quarter pillar 210 includes the same quarter pillar outer portion 28C as in the third example embodiment. A roof side outer panel 212 is arranged to the vehicle width direction inside of this quarter pillar outer portion 28C. The roof side outer panel 212 is formed in a general hat-shape that is open toward the vehicle width direction inside in a top sectional view, and is slightly inclined on the vehicle front side toward the vehicle upper side. A strainer 214 is arranged to the vehicle width direction inside of the roof side outer panel 212. The strainer 214 is formed in a general hat-shape that is open toward the vehicle width direction outside in a top sectional view, and forms a closed sectional portion 216 by being joined to front and rear flange portions of the roof side outer panel 212. A front end portion 214F of the strainer 214 in the vehicle front-rear direction extends toward the vehicle front side of the closed sectional portion 216.

A quarter lock reinforcement 218 (hereinafter, abbreviated to "quarter lock RF 218") is arranged on the vehicle width direction outside of the front end portion 214F of the strainer 214. The quarter lock RF 218 includes a side wall portion 218A that extends in the vehicle front-rear direction, a front wall portion 218B that extends curving toward the vehicle width direction inside from a front end of the side wall portion 218A, and a front flange portion 218C that protrudes curving toward the vehicle front side from an end portion of the front wall portion 218B on the vehicle width direction inside. A rear end portion of the side wall portion 218A of the quarter lock RF 218 is connected to the outside wall portion 212A of the roof side outer panel 212, and the front flange portion 218C of the quarter lock RF 218 is connected to the front end portion 214F of the strainer 214. Thus, the quarter lock RF 218, the roof side outer panel 212, and the strainer 214 together form a closed sectional portion 220.

A quarter reinforcement 222 (hereinafter, abbreviated to "quarter RF 222") is arranged to the vehicle width direction inside of the front end portion 214F of the strainer 214. The quarter RF 222 includes a main body portion 222H that is inclined on the vehicle width direction inside toward the vehicle rear side, a front flange portion 222A that protrudes curving toward the vehicle front side from a front end of the main body portion 222H, and a rear flange portion 222B that protrudes curving toward the vehicle width direction inside from a rear end of the main body portion 222H. The front flange portion 222A of the quarter RF 222 is connected to the front end portion 214F of the strainer 214, and the rear flange portion 222B of the quarter RF 222 is connected to the front wall portion 214A of the strainer 214. Thus, the quarter RF 222 and the strainer 214 together form a closed sectional portion 224.

By having the closed sectional portions 220 and 224 formed in this way, a reinforcing portion 226 that reinforces a portion overlapping with the first overlapping portion 144R in a vehicle side view is set on the quarter pillar 210.

In this example embodiment as well, substantially similar operation and effects as those of the third example embodiment are able to be obtained on the rear portion side of the vehicle side portion 10 when a side collision occurs. Also, in this example embodiment, the portion that overlaps with the first overlapping portion 144R in a vehicle side view is reinforced by the closed sectional portions 220 and 224 on the quarter pillar 210, so even if a vehicle with a high vehicle height collides at high speed from the side, for example, the quarter pillar 210 is able to stably support the load, as shown in FIG. 14. Moreover, by making the quarter pillar 210 a structure that stably supports the load, an increase in mass of the vehicle is also able to be suppressed compared to when the plate thickness of a rear side door panel is increased in an attempt to handle a side collision.

Supplemental Description of the Example Embodiments

The concept of "a portion on a vehicle width direction outside" in "a pillar that . . . , and that includes an outside vertical wall portion . . . on a portion on a vehicle width direction outside" in claim 1 includes not only a portion on the outermost side in the vehicle width direction, such as the outside vertical wall portion 18A (see FIG. 2) in the first example embodiment, but also a portion (a portion of an outer member) that is not a portion on the outermost side in the vehicle width direction of the pillar, but that can be said to be a portion on the vehicle width direction outside, such as the outside vertical wall portion 80A (see portion d of FIG. 9, and FIG. 13) in the third and fourth example embodiments.

Also, the concept of "connected to the first overlapping portion" in claim 1 includes not only a case of being directly connected to the first overlapping portion, but also a case of being connected to the first overlapping portion via an interposed member, as in the example embodiments described above.

Also, the concept of being "arranged in a position overlapping with an end portion of the instrument panel reinforcement on the vehicle width direction outside in a vehicle side view" in claim 2 includes not only a case of being "arranged in a position completely overlapping with the end portion of the instrument panel reinforcement on the vehicle width direction outside in a vehicle side view" as in the first example embodiment described above, but also a case of being "arranged in a position overlapping with a portion of the end portion of the instrument panel reinforcement on the vehicle width direction outside in a vehicle side view".

Also, the side door in the example embodiments described above is a swinging side door that is provided able to pivot around a hinge, but the side door may also be a sliding door that slides in the vehicle front-rear direction, or a gull-wing side door that is able to be flipped up in the vehicle up and down direction.

Also, in FIGS. 2 and 9 and the like, the door inner panel 44, 92, and 192 is shown as a panel member formed by a single plate, but the door inner panel may also be formed by a plurality of plates that have been joined together. For example, the door inner panel may be formed by a first plate that forms a portion on the vehicle front side being joined to a second plate that forms a middle portion in the vehicle front-rear direction, and the second plate being joined to a third plate that forms a portion on the vehicle rear side. In this case, for example, the plate thickness of both the first plate and the third plate may be set thicker than the thickness of the second plate.

Also, the example embodiments and plurality of modified examples thereof described above may be carried out in any appropriate combination.

While one example of the invention has been described, the invention is not limited to this example, and may of course also be modified in various other ways without departing from the scope thereof.

What is claimed is:
1. A vehicle side structure comprising:
  a pillar that is arranged in a vehicle up and down direction on an edge side of a door opening of a vehicle side portion, and that includes an outside vertical wall portion that extends in the vehicle up and down direction and a vehicle front-rear direction on a portion on a vehicle width direction outside;
  a side door that includes a door inner panel that opens and closes the door opening, and is arranged on a vehicle cabin inside, and a door outer panel that is arranged to a vehicle cabin outside of the door inner panel and, together with the door inner panel, forms a door main body portion, the door inner panel including a front-rear facing wall portion that faces the pillar in the vehicle front-rear direction;
  a beltline reinforcement that is arranged with the vehicle front-rear direction as a length direction along a beltline inside the door main body portion, and that has a sectional shape orthogonal to the length direction, which is formed in a hat-shape or closed sectional shape along an entire length in the length direction; and
  a bracket between the door inner panel and the beltline reinforcement, wherein a first overlapping portion that forms a portion of a step portion farther to the vehicle width direction outside than a cabin inside vertical wall portion that forms a door inside surface, and that is arranged in a position overlapping with the outside vertical wall portion in a vehicle side view, is formed on an end portion of the door inner panel in the vehicle front-rear direction;

a portion of the outside vertical wall portion is a second overlapping portion that faces the first overlapping portion at a distance that is narrower than a distance between the step portion and the cabin inside vertical wall portion;

an end portion of the beltline reinforcement is a third overlapping portion that overlaps with the second overlapping portion in the vehicle side view, the third overlapping portion being directly connected to the bracket; and the bracket includes a first wall portion and a second wall portion, the first wall portion forming a portion of the bracket on a vehicle width direction inside and being connected to the front-rear facing wall portion, the second wall portion forming a portion of the bracket on the vehicle width direction outside and being connected to an end surface of the end portion of the beltline reinforcement in the vehicle front-rear direction that faces in the vehicle front-rear direction.

2. The vehicle side structure according to claim 1, wherein the vehicle side structure is applied to a vehicle in which an instrument panel reinforcement is arranged with a vehicle width direction as a length direction, between a front end portion of each of a left and right front side door as the side door in the vehicle front-rear direction, and an end portion of the instrument panel reinforcement in the length direction is set on a vehicle rear side of a front pillar as the pillar, and is fixed to the front pillar via a connecting portion;

the first overlapping portion is formed on a rear end portion of the door inner panel in the vehicle front-rear direction, and a portion of the outside vertical wall portion of a center pillar as the pillar is the second overlapping portion, and the third overlapping portion is set on a rear end portion of the beltline reinforcement in the vehicle front-rear direction; and a load transmitting member is interposed between the beltline reinforcement and the door inner panel, on a front end portion of the front side door in the vehicle front-rear direction, and the load transmitting member is arranged in a position overlapping with an end portion of the instrument panel reinforcement on the vehicle width direction outside in the vehicle side view.

3. The vehicle side structure according to claim 1, wherein the first overlapping portion is formed on both end portions of the door inner panel in the vehicle front-rear direction, the second overlapping portion is set on both of the pillars arranged one on each of a front and rear edge side of the door opening, and the third overlapping portion is set on both end portions of the beltline reinforcement in the length direction.

4. The vehicle side structure according to claim 1, wherein the beltline reinforcement is arranged inside the door main body portion on the vehicle width direction outside.

5. The vehicle side structure according to claim 1, further comprising:

a front side door and a rear side door as the side door;

a front beltline reinforcement as the beltline reinforcement that is provided on the front side door; and a rear beltline reinforcement as the beltline reinforcement that is provided on the rear side door, wherein a rear end portion of the front beltline reinforcement and a front end portion of the rear beltline reinforcement are arranged in positions farther toward the vehicle width direction outside than a center pillar as the pillar, and in positions overlapping in a vehicle front view.

6. The vehicle side structure according to claim 1, wherein on a rear end portion of a rear side door as the side door in the vehicle front-rear direction, the first overlapping portion is formed on a rear end portion of the door inner panel in the vehicle front-rear direction, and the third overlapping portion is set on a rear end portion of the beltline reinforcement in the vehicle front-rear direction; and a reinforcing portion that reinforces a portion overlapping with the first overlapping portion in the vehicle side view, is set on a quarter pillar as the pillar.

7. The vehicle side structure according to claim 1, wherein the beltline reinforcement is welded to the bracket at the third overlapping portion.

8. The vehicle side structure according to claim 1, wherein the beltline reinforcement is welded to the second wall portion at an axial end of the beltline reinforcement.

9. A vehicle side structure comprising:

a pillar that is arranged in a vehicle up and down direction on an edge side of a door opening of a vehicle side portion, and that includes an outside vertical wall portion that extends in the vehicle up and down direction and a vehicle front-rear direction on a portion on a vehicle width direction outside;

a side door that includes a door inner panel that opens and closes the door opening, and is arranged on a vehicle cabin inside, and a door outer panel that is arranged to a vehicle cabin outside of the door inner panel and, together with the door inner panel, forms a door main body portion; and a beltline reinforcement that is arranged with the vehicle front-rear direction as a length direction along a beltline inside the door main body portion, and that has a sectional shape orthogonal to the length direction, which is formed in a hat-shape or closed sectional shape along an entire length in the length direction, wherein a first overlapping portion that forms a portion of a step portion farther to the vehicle width direction outside than a cabin inside vertical wall portion that forms a door inside surface, and that is arranged in a position overlapping with the outside vertical wall portion in a vehicle side view, is formed on an end portion of the door inner panel in the vehicle front-rear direction;

a portion of the outside vertical wall portion is a second overlapping portion that faces the first overlapping portion at a distance that is narrower than a distance between the step portion and the cabin inside vertical wall portion;

a third overlapping portion that is connected to the first overlapping portion in a position overlapping with the second overlapping portion in the vehicle side view, is set on an end portion of the beltline reinforcement in the length direction;

the beltline reinforcement is arranged on the vehicle width direction inside the door main body portion, and an end portion of the beltline reinforcement in the vehicle front-rear direction is connected to the door inner panel via a bracket;

the bracket includes a first wall portion that forms a portion of the bracket on a vehicle width direction inside, and is connected to a front-rear facing wall portion that is a portion of the end portion of the door inner panel in the vehicle front-rear direction that faces the pillar in the vehicle front-rear direction, and a second wall portion that forms a portion of the bracket on the vehicle width direction outside, and is connected to an end surface of the end portion of the beltline reinforcement in the vehicle front-rear direction that faces in the vehicle front-rear direction; and the bracket includes a connecting wall portion that connects the first wall portion to the second wall portion, the connecting wall portion being connected to the first overlapping portion of the door inner panel, and connected to the third overlapping portion of the beltline reinforcement.

* * * * *